US011877141B2

(12) United States Patent
Herre et al.

(10) Patent No.: US 11,877,141 B2
(45) Date of Patent: *Jan. 16, 2024

(54) METHOD AND SIGNAL PROCESSING UNIT FOR MAPPING A PLURALITY OF INPUT CHANNELS OF AN INPUT CHANNEL CONFIGURATION TO OUTPUT CHANNELS OF AN OUTPUT CHANNEL CONFIGURATION

(71) Applicant: Fraunhofer-Gesellschaft zur Foerderung der angewandten Forschung e.V., Munich (DE)

(72) Inventors: Juergen Herre, Erlangen (DE); Fabian Kuech, Erlangen (DE); Michael Kratschmer, Fuerth (DE); Achim Kuntz, Hemhofen (DE); Christoph Faller, Greifensee (CH)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 14 days.

This patent is subject to a terminal disclaimer.

(21) Appl. No.: 17/017,053

(22) Filed: Sep. 10, 2020

(65) Prior Publication Data

US 2021/0037334 A1 Feb. 4, 2021

Related U.S. Application Data

(63) Continuation of application No. 15/910,980, filed on Mar. 2, 2018, now Pat. No. 10,798,512, which is a (Continued)

(30) Foreign Application Priority Data

Jul. 22, 2013 (EP) .................................... 13177360
Oct. 18, 2013 (EP) .................................... 13189249

(51) Int. Cl.
*H04S 7/00* (2006.01)
*H04S 3/00* (2006.01)
(Continued)

(52) U.S. Cl.
CPC ............... *H04S 7/303* (2013.01); *H04R 5/02* (2013.01); *H04S 3/002* (2013.01); *H04S 3/02* (2013.01);
(Continued)

(58) Field of Classification Search
CPC ... H04S 7/303; H04S 7/30; H04S 7/00; H04S 7/302; H04S 7/308; H04S 7/305;
(Continued)

(56) References Cited

U.S. PATENT DOCUMENTS 4,308,423 A * 12/1981 Cohen ..................... H04S 1/002 381/1
4,841,573 A 6/1989 Fujita
(Continued)

FOREIGN PATENT DOCUMENTS

AU 2013206557 A1 7/2013
CA 2494454 A1 3/2004
(Continued)

OTHER PUBLICATIONS

"Universal Mobile Telecommunications System (UMTS); Mandatory Speech Codec speech processing functions AMR Wideband speech codec; Transcoding functions", ETSI TS 126 190 V5.1.0 (Dec. 2001); 3GPP TS 26.190 version 5.1.0 Release 5;Universal Mobile Telecommunications System (UMTS); Mandatory Speech Codec speech processing functions AMR Wideband speech codec; Transcoding functions (3GPP TS 26.190 version 5.1.0 Release 5), Dec. 2001, 55 pp.
(Continued)

*Primary Examiner* — Leshui Zhang
(74) *Attorney, Agent, or Firm* — Perkins Coie LLP; Michael A. Glenn

(57) ABSTRACT

A method for mapping a plurality of input channels of an input channel configuration to output channels of an output channel configuration includes providing a set of rules associated with each input channel of the plurality of input channels, wherein the rules define different mappings between the associated input channel and a set of output
(Continued)

channels. For each input channel of the plurality of input channels, a rule associated with the input channel is accessed, determination is made whether the set of output channels defined in the accessed rule is present in the output channel configuration, and the accessed rule is selected if the set of output channels defined in the accessed rule is present in the output channel configuration. The input channels are mapped to the output channels according to the selected rule.

29 Claims, 8 Drawing Sheets

Related U.S. Application Data continuation of application No. 15/000,876, filed on Jan. 19, 2016, now Pat. No. 9,936,327, which is a continuation of application No. PCT/EP2014/065159, filed on Jul. 15, 2014.

(51) Int. Cl.
*H04R 5/02* (2006.01)
*H04S 3/02* (2006.01)
*G10L 19/008* (2013.01)

(52) U.S. Cl.
CPC ................ *H04S 7/30* (2013.01); *H04S 7/302* (2013.01); *H04S 7/308* (2013.01); *G10L 19/008* (2013.01); *H04S 7/305* (2013.01); *H04S 2400/01* (2013.01); *H04S 2400/03* (2013.01); *H04S 2420/03* (2013.01)

(58) Field of Classification Search
CPC ... H04S 3/002; H04S 3/00; H04S 3/02; H04S 3/008; H04S 2400/01; H04S 2400/03; H04S 2420/03; H04R 5/02; G10L 19/00; G10L 19/008
USPC .......... 381/1–23, 300–311, 26, 27, 119, 123, 381/77–85, 86, 61, 63; 700/94; 704/500–504
See application file for complete search history.

(56) References Cited

U.S. PATENT DOCUMENTS 6,128,597 A 10/2000 Kolluru et al.
6,421,446 B1 * 7/2002 Cashion .................. H04S 1/005 381/17
8,050,434 B1 11/2011 Kato et al.
8,086,331 B2 12/2011 Ikeda et al.
8,306,233 B2 11/2012 Sinton et al.
8,526,484 B2 9/2013 Sato
8,638,959 B1 1/2014 Hall
2002/0006081 A1 1/2002 Fujishita
2004/0062401 A1 4/2004 Davis
2005/0157883 A1 7/2005 Herre et al.
2005/0276420 A1 12/2005 Davis
2006/0072764 A1 4/2006 Mertens et al.
2007/0011004 A1 1/2007 Liebchen
2007/0019812 A1 1/2007 Kim
2007/0080485 A1 4/2007 Kerscher et al.
2007/0255572 A1 11/2007 Miyasaka et al.
2007/0280485 A1 * 12/2007 Villemoes ................ H04S 7/30 381/119
2008/0221907 A1 9/2008 Pang et al.
2008/0279389 A1 11/2008 Yoo et al.
2008/0298610 A1 12/2008 Virolainen et al.
2009/0092259 A1 4/2009 Jot et al.
2009/0292544 A1 11/2009 Virette et al.
2010/0014692 A1 1/2010 Schreiner et al.
2010/0260483 A1 10/2010 Strub
2011/0013790 A1 1/2011 Hilpert et al.
2011/0103590 A1 5/2011 Christoph et al.
2011/0135098 A1 6/2011 Kuhr et al.
2011/0200197 A1 8/2011 Kim et al.
2011/0222693 A1 9/2011 Lee et al.
2011/0249819 A1 10/2011 Davis
2011/0255714 A1 10/2011 Neusinger et al.
2011/0255715 A1 10/2011 Doh et al.
2012/0051565 A1 3/2012 Iwata et al.
2012/0093323 A1 * 4/2012 Lee .......................... H04S 3/00 381/23
2012/0177204 A1 7/2012 Hellmuth et al.
2012/0209615 A1 * 8/2012 Thesing ................ G10L 19/008 704/500
2012/0213375 A1 8/2012 Mahabub et al.
2012/0263307 A1 10/2012 Armstrong et al.
2012/0288124 A1 11/2012 Fejzo et al.
2013/0182853 A1 7/2013 Chang et al.
2013/0216070 A1 8/2013 Keiler et al.
2013/0259236 A1 * 10/2013 Chon ...................... H04S 5/005 381/1
2013/0272525 A1 10/2013 Yoo et al.
2014/0093101 A1 4/2014 Lee et al.
2014/0133683 A1 5/2014 Robinson et al.
2014/0233762 A1 8/2014 Vilkamo et al.
2015/0350804 A1 12/2015 Crockett et al.

FOREIGN PATENT DOCUMENTS

CN 1714598 A 12/2005
CN 101010726 A 8/2007
CN 101460997 A 6/2009
CN 102273233 A 12/2011
CN 102547551 A 7/2012
CN 102656627 A 9/2012
CN 103210668 A 7/2013
EP 2434491 A1 3/2012
JP 06128724 A 5/1994
JP 08009499 B2 1/1996
JP 2003331532 A 11/2003
JP 2005535266 A 11/2005
JP 2009077379 A 4/2009
JP 2009100144 A 5/2009
JP 2014517141 A 7/2014
KR 1020120038891 A 4/2012
RU 2329548 C2 7/2008
RU 2330390 C2 7/2008
RU 2394283 C1 7/2010
RU 2406166 C2 12/2010
RU 2449388 C2 4/2012
TW 200803190 A 1/2008
TW 200939208 A 9/2009
TW 201034005 A 9/2010
TW 201108204 A 3/2011
TW 1342718 B 5/2011
TW 201320059 A 5/2013
TW 201329959 A 7/2013
WO 8706090 A1 10/1987
WO WO-9215180 A1 * 9/1992 ............... H04S 3/02
WO 2009046460 A2 4/2009
WO 2010006719 A1 1/2010
WO 2010012478 A2 2/2010
WO 2011152044 A1 12/2011
WO 2012109019 A1 8/2012
WO 2012154823 A1 11/2012
WO 2013006338 A2 1/2013
WO 2014015299 A1 1/2014
WO 2014041067 A1 3/2014

OTHER PUBLICATIONS

Ando, Akio , "Conversion of Multichannel Sound Signal Maintaining Physical Properties of Sound in Reproduced Sound Field", IEEE Transactions on Audio, Speech, and Language Processing, vol. 19, No. 6, pp. 1467-1474.
Blauert, Jens , "Ein Neuartiges Prasenfilter", Fernseh-und Kinotechnik 1970, Nr. 3http://www.sengpielaudio.com/Blauert-Filter.pdf, pp. 75-78.
Blauert, Jens , "Ein Neuartiges Prasenfilter", Fernseh-und

(56) References Cited

OTHER PUBLICATIONS

KinotechnikNr. 3. Retrieved from the Internet: URL:http://www.sengpielaudio.com/Blauert-Filter.pdf, pp. 75-78.
Pulkki, Ville , "Virtual Sound Source Positioning Using Vector Base Amplitude Panning", Journal of Audio Eng. Soc. vol. 45, No. 6., pp. 456-466.

* cited by examiner

METHOD AND SIGNAL PROCESSING UNIT FOR MAPPING A PLURALITY OF INPUT CHANNELS OF AN INPUT CHANNEL CONFIGURATION TO OUTPUT CHANNELS OF AN OUTPUT CHANNEL CONFIGURATION

CROSS-REFERENCE TO RELATED APPLICATIONS

This application is a continuation of copending U.S. patent application Ser. No. 15/910,980, filed Mar. 2, 2018, which in turn is a continuation of U.S. patent application Ser. No. 15/000,876 filed Jan. 19, 2016, which is a continuation of copending International Application No. PCT/EP2014/065159, filed Jul. 15, 2014, which is incorporated herein by reference in its entirety, and additionally claims priority from European Applications Nos. EP 13177360.8, filed Jul. 22, 2013, and EP 13189249.9, filed Oct. 18, 2013, both of which are incorporated herein by reference in their entirety.

The present invention relates to methods and signal processing units for mapping a plurality of input channels of an input channel configuration to output channels of an output channel configuration, and, in particular, methods and apparatus suitable for a format downmix conversion between different loudspeaker channel configurations.

BACKGROUND OF THE INVENTION

Spatial audio coding tools are well-known in the art and are standardized, for example, in the MPEG-surround standard. Spatial audio coding starts from a plurality of original input, e.g., five or seven input channels, which are identified by their placement in a reproduction setup, e.g., as a left channel, a center channel, a right channel, a left surround channel, a right surround channel and a low frequency enhancement (LFE) channel. A spatial audio encoder may derive one or more downmix channels from the original channels and, additionally, may derive parametric data relating to spatial cues such as interchannel level differences in the channel coherence values, interchannel phase differences, interchannel time differences, etc. The one or more downmix channels are transmitted together with the parametric side information indicating the spatial cues to a spatial audio decoder for decoding the downmix channels and the associated parametric data in order to finally obtain output channels which are an approximated version of the original input channels. The placement of the channels in the output setup may be fixed, e.g., a 5.1 format, a 7.1 format, etc.

Also, spatial audio object coding tools are well-known in the art and are standardized, for example, in the MPEG SAOC standard (SAOC=spatial audio object coding). In contrast to spatial audio coding starting from original channels, spatial audio object coding starts from audio objects which are not automatically dedicated for a certain rendering reproduction setup. Rather, the placement of the audio objects in the reproduction scene is flexible and may be set by a user, e.g., by inputting certain rendering information into a spatial audio object coding decoder. Alternatively or additionally, rendering information may be transmitted as additional side information or metadata; rendering information may include information at which position in the reproduction setup a certain audio object is to be placed (e.g. over time). In order to obtain a certain data compression, a number of audio objects is encoded using an SAOC encoder which calculates, from the input objects, one or more transport channels by downmixing the objects in accordance with certain downmixing information. Furthermore, the SAOC encoder calculates parametric side information representing inter-object cues such as object level differences (OLD), object coherence values, etc. As in SAC (SAC=Spatial Audio Coding), the inter object parametric data is calculated for individual time/frequency tiles. For a certain frame (for example, 1024 or 2048 samples) of the audio signal a plurality of frequency bands (for example 24, 32, or 64 bands) are considered so that parametric data is provided for each frame and each frequency band. For example, when an audio piece has 20 frames and when each frame is subdivided into 32 frequency bands, the number of time/frequency tiles is 640.

A desired reproduction format, i.e. an output channel configuration (output loudspeaker configuration) may differ from an input channel configuration, wherein the number of output channels is generally different from the number of input channels. Thus, a format conversion may be used for mapping the input channels of the input channel configuration to the output channels of the output channel configuration.

SUMMARY

According to an embodiment, a method for mapping a plurality of input channels of an input channel configuration to output channels of an output channel configuration may have the steps of: providing a set of rules associated with each input channel of the plurality of input channels, wherein the rules define different mappings between the associated input channel and a set of output channels; for each input channel of the plurality of input channels, accessing a rule associated with the input channel, determining whether the set of output channels defined in the accessed rule is present in the output channel configuration, and selecting the accessed rule if the set of output channels defined in the accessed rule is present in the output channel configuration; and mapping the input channels to the output channels according to the selected rule.

According to another embodiment, a non-transitory digital storage medium may have a computer program stored thereon to perform the inventive method, when said computer program is run by a computer.

According to yet another embodiment, a signal processing unit may have a processor configured or programmed to perform the inventive method.

According to still another embodiment, an audio decoder may have a signal processing unit which may have a processor configured or programmed to perform the inventive method.

Embodiments of the invention are based on a novel approach, in which a set of rules describing potential input-output channel mappings is associated with each input channel of a plurality of input channels and in which one rule of the set of rules is selected for a given input-output channel configuration. Accordingly, the rules are not associated with an input channel configuration or with a specific input-channel configuration. Thus, for a given input channel configuration and a specific output channel configuration, for each of a plurality of input channels present in the given input channel configuration, the associated set of rules is accessed in order to determine which of the rules matches the given output channel configuration. The rules may define one or more coefficients to be applied to the input channels directly or may define a process to be applied to derive the coefficients to be applied to the input channels. Based on the coefficients, a coefficient matrix, such as a downmix (DMX) matrix may be generated which may be applied to the input channels of the given input channel configuration to map same to the output channels of the given output channel configuration. Since the set of rules are associated with the input channels rather than an input channel configuration or a specific input-output channel configuration, the inventive approach can be used for different input channel configurations and different output channel configurations in a flexible manner.

In embodiments of the invention, the channels represent audio channels, wherein each input channel and each output channel has a direction in which an associated loudspeaker is located relative to a central listener position.

BRIEF DESCRIPTION OF THE DRAWINGS

Embodiments of the present invention will be detailed subsequently referring to the appended drawings, in which.

DETAILED DESCRIPTION OF THE INVENTION

Before describing embodiments of the inventive approach in detail, an overview of a 3D audio codec system in which the inventive approach may be implemented is given.

Figure 1:
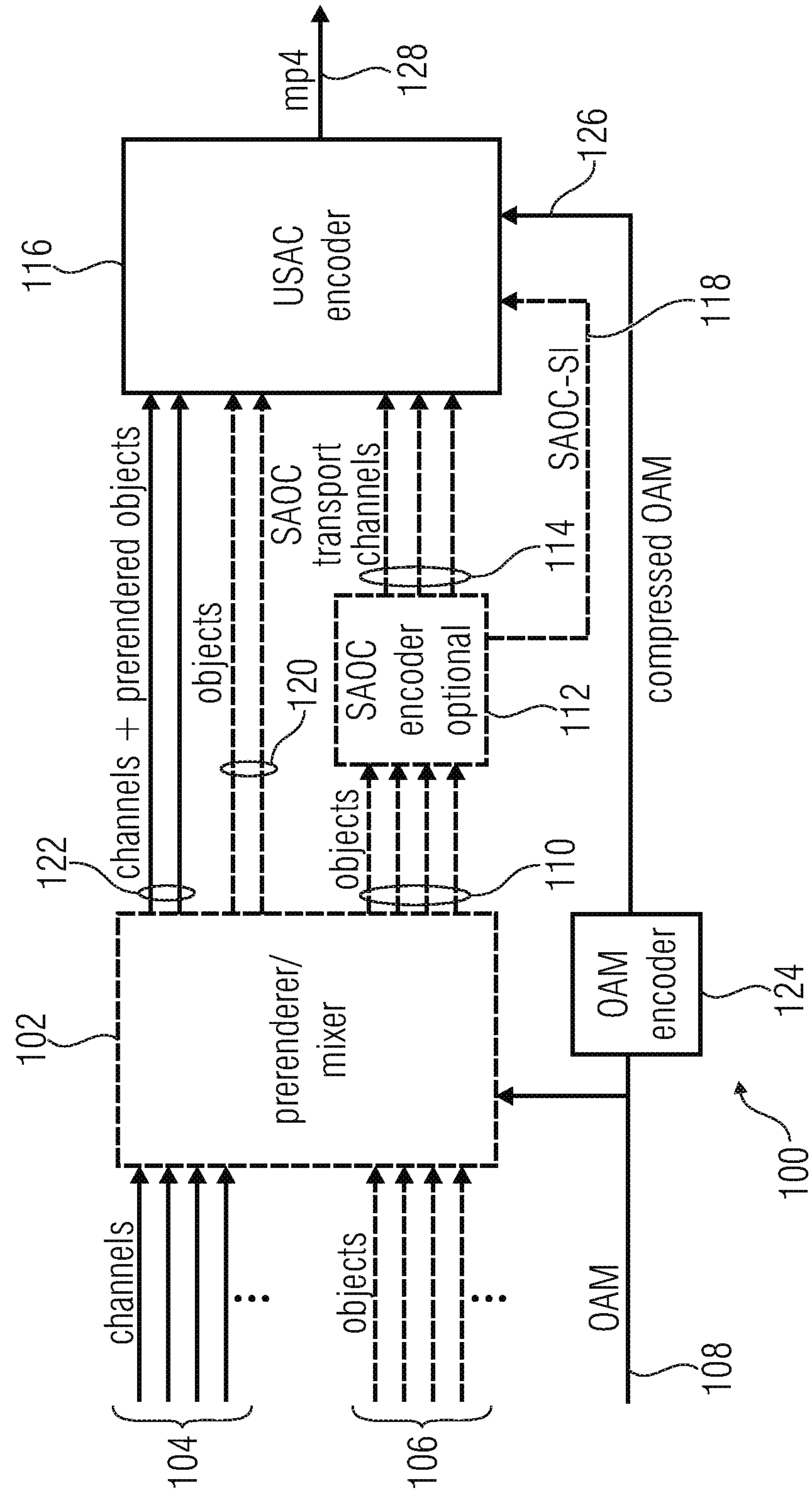
FIG. 1 shows an overview of a 3D audio encoder of a 3D audio system.
Figure 2:
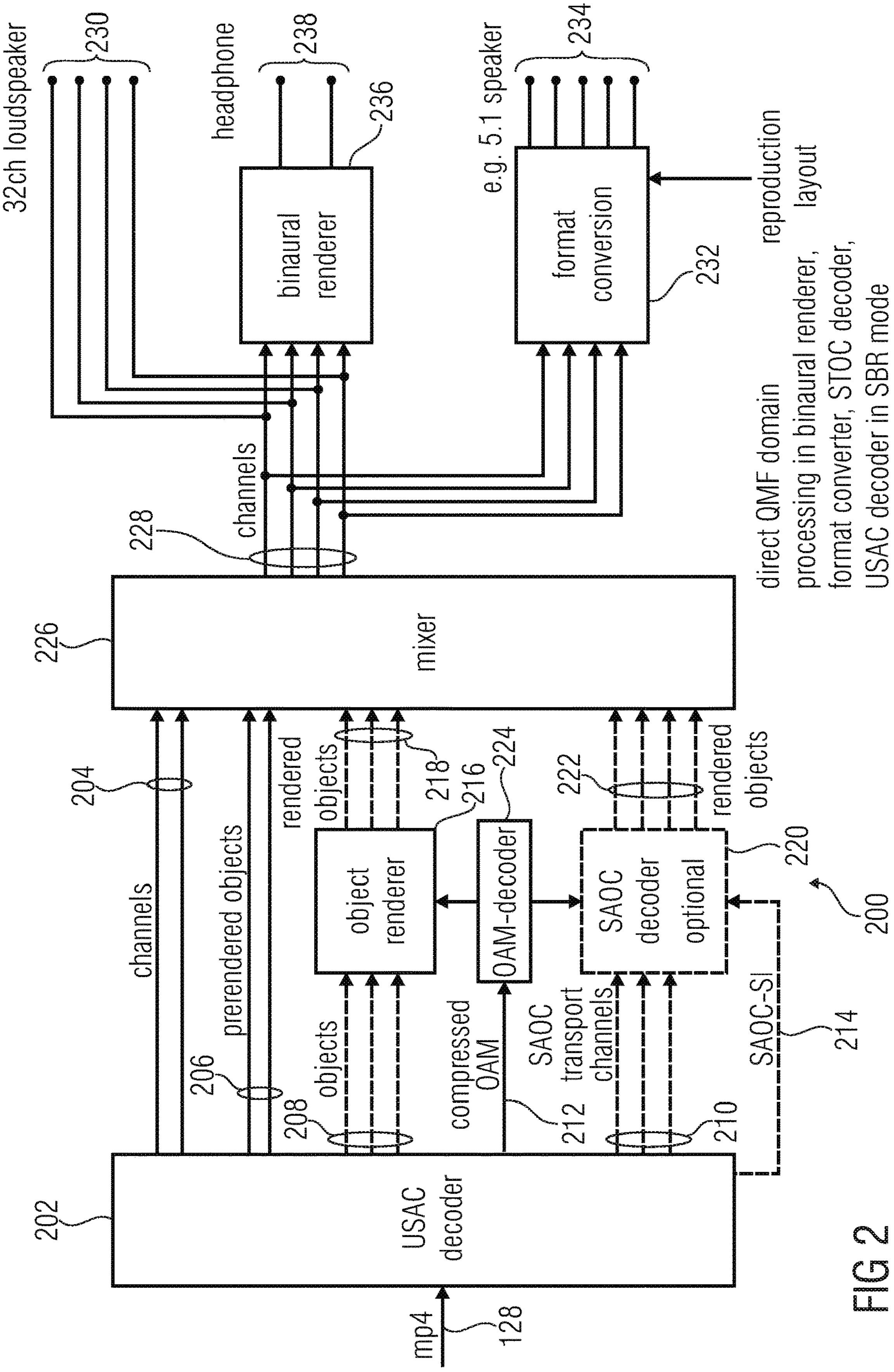
FIG. 2 shows an overview of a 3D audio decoder of a 3D audio system.

FIGS. 1 and 2 show the algorithmic blocks of a 3D audio system in accordance with embodiments. More specifically, FIG. 1 shows an overview of a 3D audio encoder 100. The audio encoder 100 receives at a pre-renderer/mixer circuit 102, which may be optionally provided, input signals, more specifically a plurality of input channels providing to the audio encoder 100 a plurality of channel signals 104, a plurality of object signals 106 and corresponding object metadata 108. The object signals 106 processed are by the pre-renderer/mixer 102 (see signals 110) may be provided to a SAOC encoder 112 (SAOC=Spatial Audio Object Coding). The SAOC encoder 112 generates the SAOC transport channels 114 provided to the inputs of an USAC encoder 116 (USAC=Unified Speech and Audio Coding). In addition, the signal SAOC-SI 118 (SAOC-SI=SAOC side information) is also provided to the inputs of the USAC encoder 116. The USAC encoder 116 further receives object signals 120 directly from the pre-renderer/mixer as well as the channel signals and pre-rendered object signals 122. The object metadata information 108 is applied to a OAM encoder 124 (OAM=object metadata) providing the compressed object metadata information 126 to the USAC encoder. The USAC encoder 116, on the basis of the above mentioned input signals, generates a compressed output signal MP4, as is shown at 128.

FIG. 2 shows an overview of a 3D audio decoder 200 of the 3D audio system. The encoded signal 128 (MP4) generated by the audio encoder 100 of FIG. 1 is received at the audio decoder 200, more specifically at an USAC decoder 202. The USAC decoder 202 decodes the received signal 128 into the channel signals 204, the pre-rendered object signals 206, the object signals 208, and the SAOC transport channel signals 210. Further, the compressed object metadata information 212 and the signal SAOC-SI 214 is output by the USAC decoder. The object signals 208 are provided to an object renderer 216 outputting the rendered object signals 218. The SAOC transport channel signals 210 are supplied to the SAOC decoder 220 outputting the rendered object signals 222. The compressed object meta information 212 is supplied to the OAM decoder 224 outputting respective control signals to the object renderer 216 and the SAOC decoder 220 for generating the rendered object signals 218 and the rendered object signals 222. The decoder further comprises a mixer 226 receiving, as shown in FIG. 2, the input signals 204, 206, 218 and 222 for outputting the channel signals 228. The channel signals can be directly output to a loudspeaker, e.g., a 32 channel loudspeaker, as is indicated at 230. Alternatively, the signals 228 may be provided to a format conversion circuit 232 receiving as a control input a reproduction layout signal indicating the way the channel signals 228 are to be converted. In the embodiment depicted in FIG. 2, it is assumed that the conversion is to be done in such a way that the signals can be provided to a 5.1 speaker system as is indicated at 234. Also, the channels signals 228 are provided to a binaural renderer 236 generating two output signals, for example for a headphone, as is indicated at 238.

The encoding/decoding system depicted in FIGS. 1 and 2 may be based on the MPEG-D USAC codec for coding of channel and object signals (see signals 104 and 106). To increase the efficiency for coding a large amount of objects, the MPEG SAOC technology may be used. Three types of renderers may perform the tasks of rendering objects to channels, rendering channels to headphones or rendering channels to a different loudspeaker setup (see FIG. 2, reference signs 230, 234 and 238). When object signals are explicitly transmitted or parametrically encoded using SAOC, the corresponding object metadata information 108 is compressed (see signal 126) and multiplexed into the 3D audio bitstream 128.

FIGS. 1 and 2 show the algorithm blocks for the overall 3D audio system which will be described in further detail below.

The pre-renderer/mixer 102 may be optionally provided to convert a channel plus object input scene into a channel scene before encoding. Functionally, it is identical to the object renderer/mixer that will be described in detail below. Pre-rendering of objects may be desired to ensure a deterministic signal entropy at the encoder input that is basically independent of the number of simultaneously active object signals. With pre-rendering of objects, no object metadata transmission is required. Discrete object signals are rendered to the channel layout that the encoder is configured to use. The weights of the objects for each channel are obtained from the associated object metadata (OAM).

The USAC encoder 116 is the core codec for loudspeaker-channel signals, discrete object signals, object downmix signals and pre-rendered signals. It is based on the MPEG-D USAC technology. It handles the coding of the above signals by creating channel- and object mapping information based on the geometric and semantic information of the input channel and object assignment. This mapping information describes how input channels and objects are mapped to USAC-channel elements, like channel pair elements (CPEs), single channel elements (SCEs), low frequency effects (LFEs) and channel quad elements (QCEs) and CPEs, SCEs and LFEs, and the corresponding information is transmitted to the decoder. All additional payloads like SAOC data 114, 118 or object metadata 126 are considered in the encoders rate control. The coding of objects is possible in different ways, depending on the rate/distortion requirements and the interactivity requirements for the renderer. In accordance with embodiments, the following object coding variants are possible:

- Pre-rendered objects: Object signals are pre-rendered and mixed to the 22.2 channel signals before encoding. The subsequent coding chain sees 22.2 channel signals.
- Discrete object waveforms: Objects are supplied as monophonic waveforms to the encoder. The encoder uses single channel elements (SCEs) to transmit the objects in addition to the channel signals. The decoded objects are rendered and mixed at the receiver side. Compressed object metadata information is transmitted to the receiver/renderer.
- Parametric object waveforms: Object properties and their relation to each other are described by means of SAOC parameters. The down-mix of the object signals is coded with the USAC. The parametric information is transmitted alongside. The number of downmix channels is chosen depending on the number of objects and the overall data rate. Compressed object metadata information is transmitted to the SAOC renderer.

The SAOC encoder 112 and the SAOC decoder 220 for object signals may be based on the MPEG SAOC technology. The system is capable of recreating, modifying and rendering a number of audio objects based on a smaller number of transmitted channels and additional parametric data, such as OLDs, IOCs (Inter Object Coherence), DMGs (Down Mix Gains). The additional parametric data exhibits a significantly lower data rate than may be used for transmitting all objects individually, making the coding very efficient. The SAOC encoder 112 takes as input the object/channel signals as monophonic waveforms and outputs the parametric information (which is packed into the 3D-Audio bitstream 128) and the SAOC transport channels (which are encoded using single channel elements and are transmitted). The SAOC decoder 220 reconstructs the object/channel signals from the decoded SAOC transport channels 210 and the parametric information 214, and generates the output audio scene based on the reproduction layout, the decompressed object metadata information and optionally on the basis of the user interaction information.

The object metadata codec (see OAM encoder 124 and OAM decoder 224) is provided so that, for each object, the associated metadata that specifies the geometrical position and volume of the objects in the 3D space is efficiently coded by quantization of the object properties in time and space. The compressed object metadata cOAM 126 is transmitted to the receiver 200 as side information.

The object renderer 216 utilizes the compressed object metadata to generate object waveforms according to the given reproduction format. Each object is rendered to a certain output channel 218 according to its metadata. The output of this block results from the sum of the partial results. If both channel based content as well as discrete/parametric objects are decoded, the channel based waveforms and the rendered object waveforms are mixed by the mixer 226 before outputting the resulting waveforms 228 or before feeding them to a postprocessor module like the binaural renderer 236 or the loudspeaker renderer module 232.

The binaural renderer module 236 produces a binaural downmix of the multichannel audio material such that each input channel is represented by a virtual sound source. The processing is conducted frame-wise in the QMF (Quadrature Mirror Filterbank) domain, and the binauralization is based on measured binaural room impulse responses.

The loudspeaker renderer 232 converts between the transmitted channel configuration 228 and the desired reproduction format. It may also be called "format converter". The format converter performs conversions to lower numbers of output channels, i.e., it creates downmixes.

Figure 3:
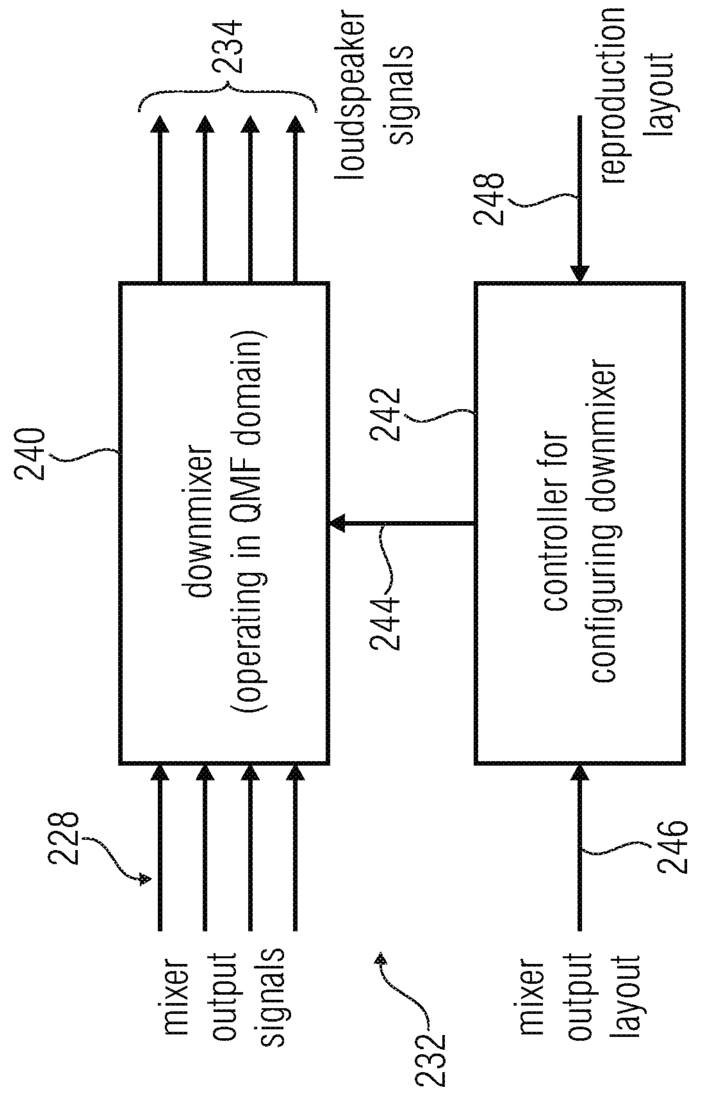
FIG. 3 shows an example for implementing a format converter that may be implemented in the 3D audio decoder of FIG. 2.

A possible implementation of a format converter 232 is shown in FIG. 3. In embodiments of the invention, the signal processing unit is such a format converter. The format converter 232, also referred to as loudspeaker renderer, converts between the transmitter channel configuration and the desired reproduction format by mapping the transmitter (input) channels of the transmitter (input) channel configuration to the (output) channels of the desired reproduction format (output channel configuration). The format converter 232 generally performs conversions to a lower number of output channels, i.e., it performs a downmix (DMX) process 240. The downmixer 240, which advantageously operates in the QMF domain, receives the mixer output signals 228 and outputs the loudspeaker signals 234. A configurator 242, also referred to as controller, may be provided which receives, as a control input, a signal 246 indicative of the mixer output layout (input channel configuration), i.e., the layout for which data represented by the mixer output signal 228 is determined, and the signal 248 indicative of the desired reproduction layout (output channel configuration). Based on this information, the controller 242, advantageously automatically, generates downmix matrices for the given combination of input and output formats and applies these matrices to the downmixer 240. The format converter 232 allows for standard loudspeaker configurations as well as for random configurations with non-standard loudspeaker positions.

Embodiments of the present invention relate to the implementation of the loudspeaker renderer 232, i.e. methods and signal processing units for implementing the functionality of the loudspeaker renderer 232.

Figure 4:
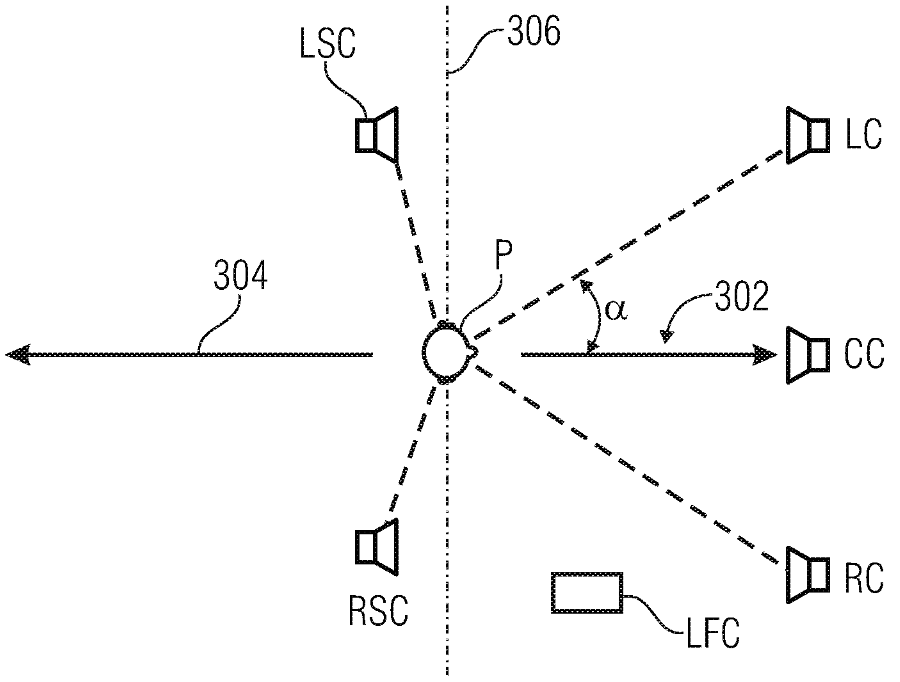
FIG. 4 shows a schematic top view of a loudspeaker configuration.
Figure 5:
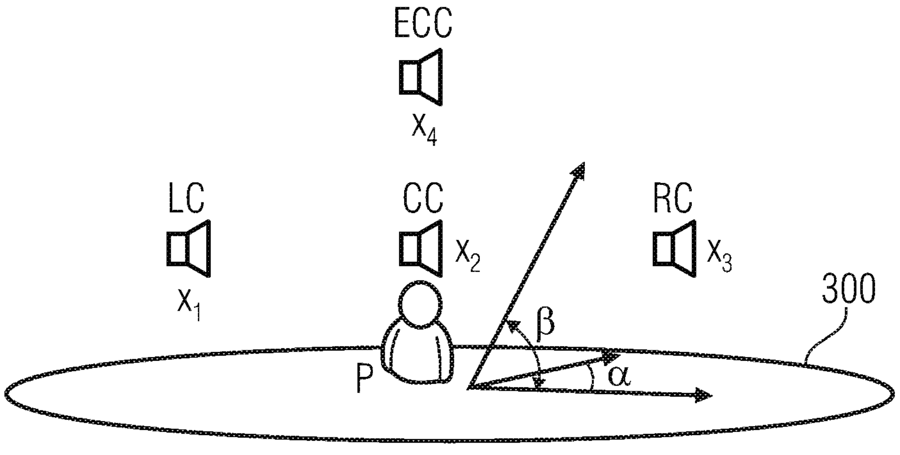
FIG. 5 shows a schematic back view of another loudspeaker configuration.

Reference is now made to FIGS. 4 and 5. FIG. 4 shows aloudspeaker configuration representing a 5.1 format comprising six loudspeakers representing a left channel LC, a center channel CC, a right channel RC, a left surround channel LSC, a right surround channel LRC and a low frequency enhancement channel LFC. FIG. 5 shows another loudspeaker configuration comprising loudspeakers representing left channel LC, a center channel CC, a right channel RC and an elevated center channel ECC.

In the following, the low frequency enhancement channel is not considered since the exact position of the loudspeaker (subwoofer) associated with the low frequency enhancement channel is not important.

The channels are arranged at specific directions with respect to a central listener Position P. The direction of each channel is defined by an azimuth angle α and an elevation angle β, see FIG. 5. The azimuth angle represents the angle of the channel in a horizontal listener plane 300 and may represent the direction of the respective channel with respect to a front center direction 302. As can be seen in FIG. 4, the front center direction 302 may be defined as the supposed viewing direction of a listener located at the central listener position P. A rear center direction 304 comprises an azimuth angle of 180° relative to the front center direction 300. All azimuth angles on the left of the front center direction between the front center direction and the rear center direction are on the left side of the front center direction and all azimuth angles on the right of the front center direction between the front center direction and the rear center direction are on the right side of the front center direction. Loudspeakers located in front of a virtual line 306, which is orthogonal to the front center direction 302 and passes the central listener position, are front loudspeakers and loudspeakers located behind virtual line 306 are rear loudspeakers. In the 5.1 format, the azimuth angle $\alpha$ of channel LC is 30° to the left, $\alpha$ of CC is 0°, the $\alpha$ of RC is 30° to the right, $\alpha$ of LSC is 110° to the left, and $\alpha$ of RSC is 110° to the right.

The elevation angle $\beta$ of a channel defines the angle between the horizontal listener plane 300 and the direction of a virtual connection line between the central listener position and the loudspeaker associated with the channel. In the configuration shown in FIG. 4, all loudspeakers are arranged within the horizontal listener plane 300 and, therefore, all elevation angles are zero. In FIG. 5, elevation angle $\beta$ of channel ECC may be 30°. A loudspeaker located exactly above the central listener position would have an elevation angle of 90°. Loudspeakers arranged below the horizontal listener plane 300 have a negative elevation angle.

The position of a particular channel in space, i.e. the loudspeaker position associated with the particular channel) is given the azimuth angle, the elevation angle and the distance of the loudspeaker from the central listener position.

Downmix applications render a set of input channels to a set of output channels where the number of input channels in general is larger than the number of output channels. One or more input channels may be mixed together to the same output channel. At the same time, one or more input channels may be rendered over more than one output channel. This mapping from the input channels to the output channel is determined by a set of downmix coefficients (or alternatively formulated as a downmix matrix). The choice of downmix coefficients significantly affects the achievable downmix output sound quality. Bad choices may lead to an unbalanced mix or bad spatial reproduction of the input sound scene.

To obtain good downmix coefficients, an expert (e.g. sound engineer) may manually tune the coefficients, taking into account his expert knowledge. However, there are multiple reasons speaking against the manual tuning in some applications: The number of channel configurations (channel setups) in the market is increasing, calling for new tuning effort for each new configuration. Due to the increasing number of configurations the manual individual optimization of DMX matrices for every possible combination of input and output channel configurations becomes impracticable. New configurations will emerge on the production side calling for new DMX matrices from/to existing configurations or other new configurations. The new configurations may emerge after a downmixing application has been deployed so that no manual tuning is possible any more. In typical application scenarios (e.g. living-room loudspeaker listening) standard-compliant loudspeaker setups (e.g. 5.1 surround according to ITU-R BS 775) are rather exceptions than the rule. DMX matrices for such non-standard loudspeaker setups cannot be optimized manually since they are unknown during the system design.

Existing or previously proposed systems for determining DMX matrices comprise employing hand-tuned downmix matrices in many downmix applications. The downmix coefficients of these matrices are not derived in an automatic way, but are optimized by a sound-engineer to provide the best downmix quality. The sound-engineer can take into account the different properties of different input channels during the design of the DMX coefficients (e.g. different handling for the center channel, for the surround channels, etc.). However, as has been outlined above, the manual derivation of downmix coefficients for every possible input-output channel configuration combination is rather impracticable and even impossible if new input and/or output configurations are added at a later stage after the design process.

One straight-forward possibility to automatically derive downmix coefficients for a given combination of input and output configurations is to treat each input channel as a virtual sound source whose position in space is given by the position in space associated with the particular channel (i.e. the loudspeaker position associated with the particular input channel). Each virtual source can be reproduced by a generic panning algorithm like tangent-law panning in 2D or vector base amplitude panning in 3D, see V. Pulkki: "Virtual Sound Source Positioning Using Vector Base Amplitude Panning", Journal of the Audio Engineering Society, vol. 45, pp. 456-466, 1997. The panning gains of the applied panning law thus determine the gains that are applied when mapping the input channels to the output channels, i.e. the panning gains are the desired downmix coefficients. While generic panning algorithms allow to automatically derive DMX matrices, the obtained downmix sound quality is usually low due to various reasons:

Panning is applied for every input channel position that is not present in the output configuration. This leads to the situation where the input signals are coherently distributed over a number of output channels very often. This is undesired, since it deteriorates the reproduction of enveloping sounds like reverberation. Also for discrete sound components in the input signal the reproduction as phantom sources causes undesired changes in source width and coloration.

Generic panning does not take into account different properties of different channels, e.g. it does not allow to optimize the downmix coefficients for the center channel differently from other channels. Optimizing the downmix differently for different channels according to the channel semantics generally would allow for higher output signal quality.

Generic panning does not account for psycho-acoustic knowledge that would call for different panning algorithms for frontal channels, side channels, etc. Moreover, generic panning results in panning gains for the rendering on widely spaced loudspeakers that do not result in correct reproduction of the spatial sound scene on the output configuration.

Generic panning including panning over vertically spaced loudspeakers does not lead to good results since it does not take into account psycho-acoustic effects (vertical spatial perception cues differ from horizontal cues).

Generic panning does not take into account that listeners predominantly point their head towards an advantageous direction ('front', screen), thus it delivers sub-optimal results.

Another proposal for the mathematical (i.e. automatic) derivation of DMX coefficients for a given combination of input and output channel configurations has been made in A. Ando: "Conversion of Multichannel Sound Signal Maintaining Physical Properties of Sound in Reproduced Sound Field", IEEE Transactions on Audio, Speech, and Language Processing, Vol. 19, No. 6, August 2011. This derivation is also based on a mathematical formulation that does not take into account the semantics of the input and output channel configuration. Thus it shares the same problems as the tangent law or VBAP panning approach.

Embodiments of the invention provide for a novel approach for format conversion between different loudspeaker channel configurations that may be performed as a downmixing process that maps a number of input channels to a number of output channels where the number of output channels is generally smaller than the number of input channels, and where the output channel positions may differ from the input channel positions. Embodiments of the invention are directed to novel approaches to improve the performance of such downmix implementations.

Although embodiments of the invention are described in connection with audio coding, it is to be noted the described novel downmix related approaches may also be applied to downmixing applications in general, i.e. to applications that e.g. do not involve audio coding.

Embodiments of the invention relate to a method and a signal processing unit (system) for automatically generating DMX coefficients or DMX matrices that can be applied in a downmixing application, e.g. for the downmixing process described above referring to FIGS. 1 to 3. The DMX coefficients are derived depending on the input and output channel configurations. An input channel configuration and an output channel configuration may be taken as input data and optimized DMX coefficients (or an optimized DMX matrix) may be derived from the input data. In the following description, the term downmix coefficients relates to static downmix coefficients, i.e. downmix coefficients that do not depend on the input audio signal wave forms. In a downmixing application, additional coefficients (e.g. dynamic, time varying gains) may be applied e.g. to preserve the power of the input signals (so called active downmixing technique). Embodiments of the discloses system for the automatic generation of DMX matrices allow for high-quality DMX output signals for given input and output channel configurations.

In embodiments of the invention, mapping an input channel to one or more output channels includes deriving at least one coefficient to be applied to the input channel for each output channel to which the input channel is mapped. The at least one coefficient may include a gain coefficient, i.e. a gain value, to be applied to the input signal associated with the input channel, and/or a delay coefficient, i.e. a delay value to be applied to the input signal associated with the input channel. In embodiments of the invention, mapping may include deriving frequency selective coefficients, i.e. different coefficients for different frequency bands of the input channels. In embodiments of the invention, mapping the input channels to the output channels includes generating one or more coefficient matrices from the coefficients. Each matrix defines a coefficient to be applied to each input channel of the input channel configuration for each output channel of the output channel configuration. For output channels, which the input channel is not mapped to, the respective coefficient in the coefficient matrix will be zero. In embodiments of the invention, separate coefficient matrices for gain coefficients and delay coefficients may be generated. In embodiments of the invention, a coefficient matrix for each frequency band may be generated in case the coefficients are frequency selective. In embodiments of the invention, mapping may further include applying the derived coefficients to the input signals associated with the input channels.

Figure 6A:
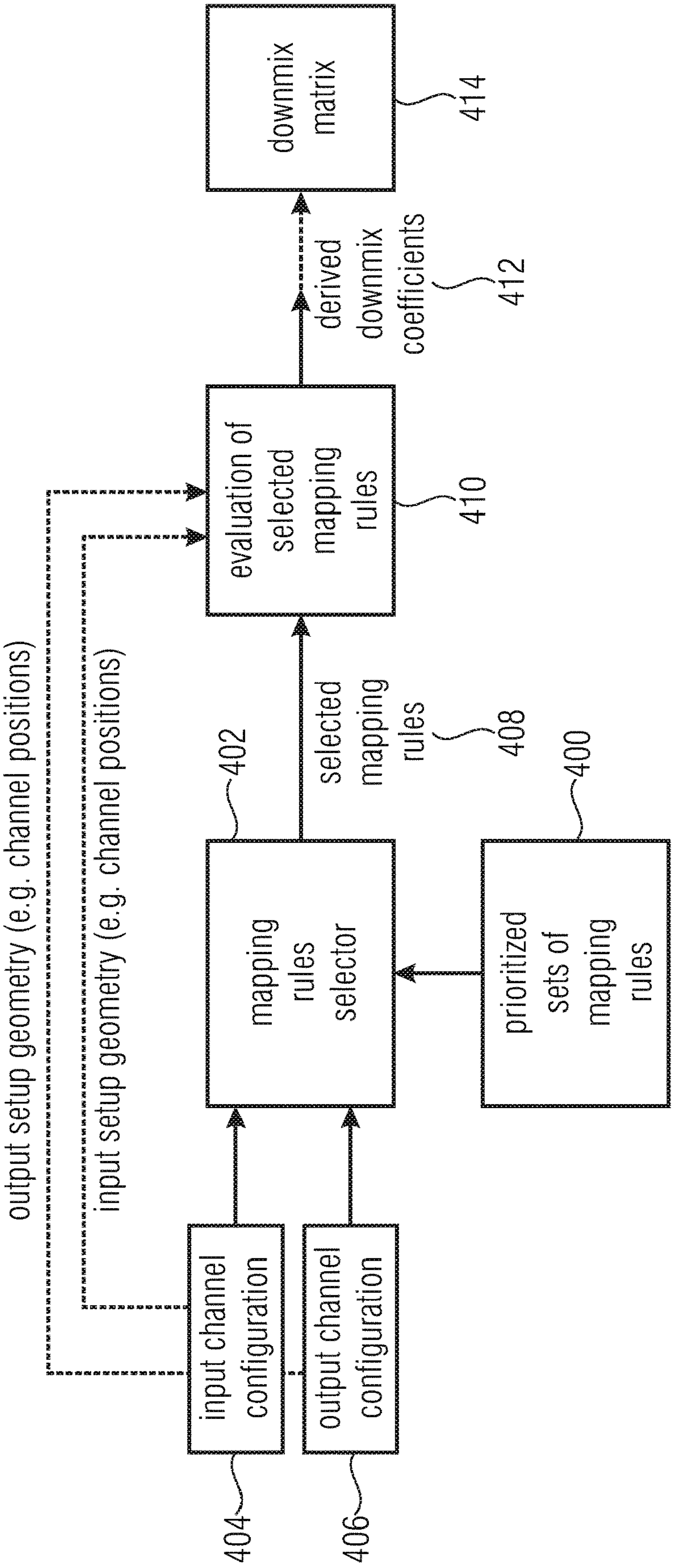
FIG. 6*a* shows a block diagram of a signal processing unit for mapping input channels of an input channel configuration to output channels of an output channel configuration.

FIG. 6 shows a system for the automatic generation of a DMX matrix. The system comprises sets of rules describing potential input-output channel mappings, block 400, and a selector 402 that selects the most appropriate rules for a given combination of an input channel configuration 404 and an output channel configuration combination 406 based on the sets of rules 400. The system may comprise an appropriate interface to receive information on the input channel configuration 404 and the output channel configuration 406.

The input channel configuration defines the channels present in an input setup, wherein each input channel has associated therewith a direction or position. The output channel configuration defines the channels present in the output setup, wherein each output channel has associated therewith a direction or position.

The selector 402 supplies the selected rules 408 to an evaluator 410. The evaluator 410 receives the selected rules 408 and evaluates the selected rules 408 to derive DMX coefficients 412 based on the selected rules 408. A DMX matrix 414 may be generated from the derived downmix coefficients. The evaluator 410 may be configured to derive the downmix matrix from the downmix coefficients. The evaluator 410 may receive information on the input channel configuration and the output channel configuration, such as information on the output setup geometry (e.g. channel positions) and information on the input setup geometry (e.g. channel positions) and take the information into consideration when deriving the DMX coefficients.

Figure 6B:
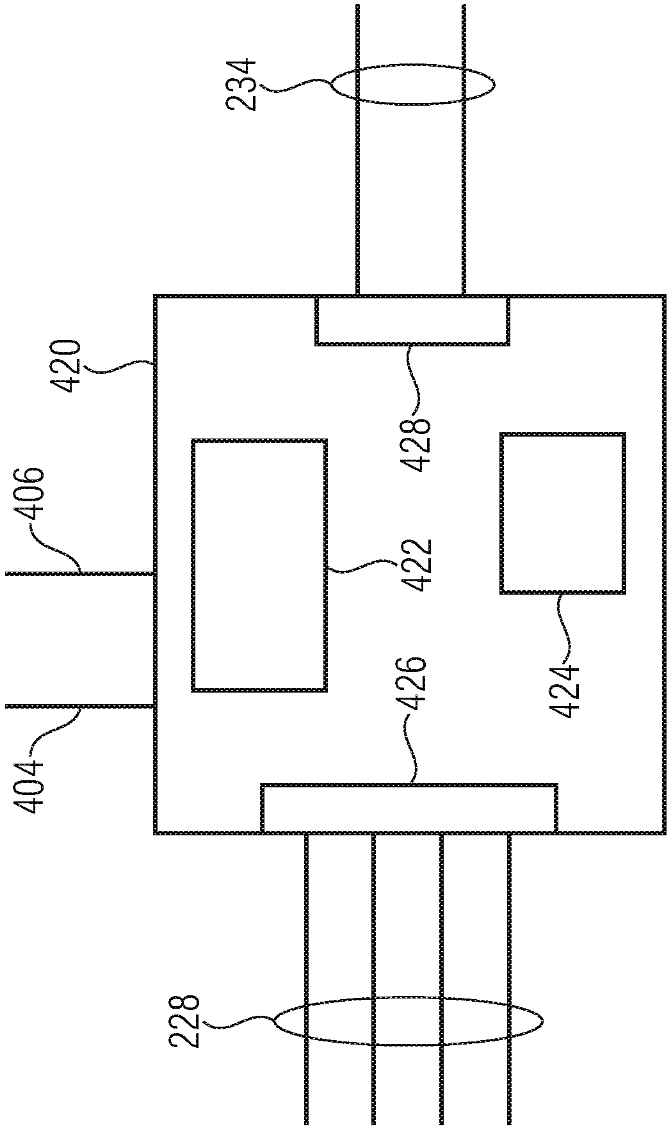
FIG. 6*b* shows a signal processing unit according to an embodiment of the invention.

As shown in FIG. 6*b*, the system may be implemented in a signal processing unit 420 comprising a processor 422 programmed or configured to act as the selector 402 and the evaluator 410 and a memory 424 configured to store at least part of the sets 400 of mapping rules. Another part of the mapping rules may be checked by the processor without accessing the rules stored in memory 424. In either case, the rules are provided to the processor in order to perform the described methods. The signal processing unit may include an input interface 426 for receiving the input signals 228 associated with the input channels and an output interface 428 for outputting the output signals 234 associated with the output channels.

It is to be noted that the rules generally apply to input channels, not input channel configurations, such that each rule may be utilized for a multitude of input channel configurations that share the same input channel the particular rule is designed for.

The sets of rules include a set of rules that describe possibilities to map each input channel to one or several output channels. For some input channels, the set or rules may include a single channel only, but generally, the set of rules will include a plurality (multitude) of rules for most or all input channels. The set of rules may be filled by a system designer who incorporates expert knowledge about downmixing when filling the set of rules. E.g. the designer may incorporate knowledge about psycho-acoustics or his artistic intentions.

Potentially several different mapping rules may exist for each input channel. Different mapping rules e.g. define different possibilities to render an input channel under consideration on output channels depending on the list of output channels that are available in the particular use case. In other words, for each input channel there may exist a multitude of rules, e.g. each defining the mapping from the input channel to a different set of output loudspeakers, where the set of output loudspeakers may also consist of only one loudspeaker or may even be empty.

The probably most common reason to have multiple rules for one input channel in the set of mapping rules is that different available output channels (determined by different possible output channel configurations) may use different mappings from the one input channel to the available output channels. E.g. one rule may define the mapping from a specific input channel to a specific output loudspeaker that is available in one output channel configuration but not in another output channel configuration.

Figure 7:
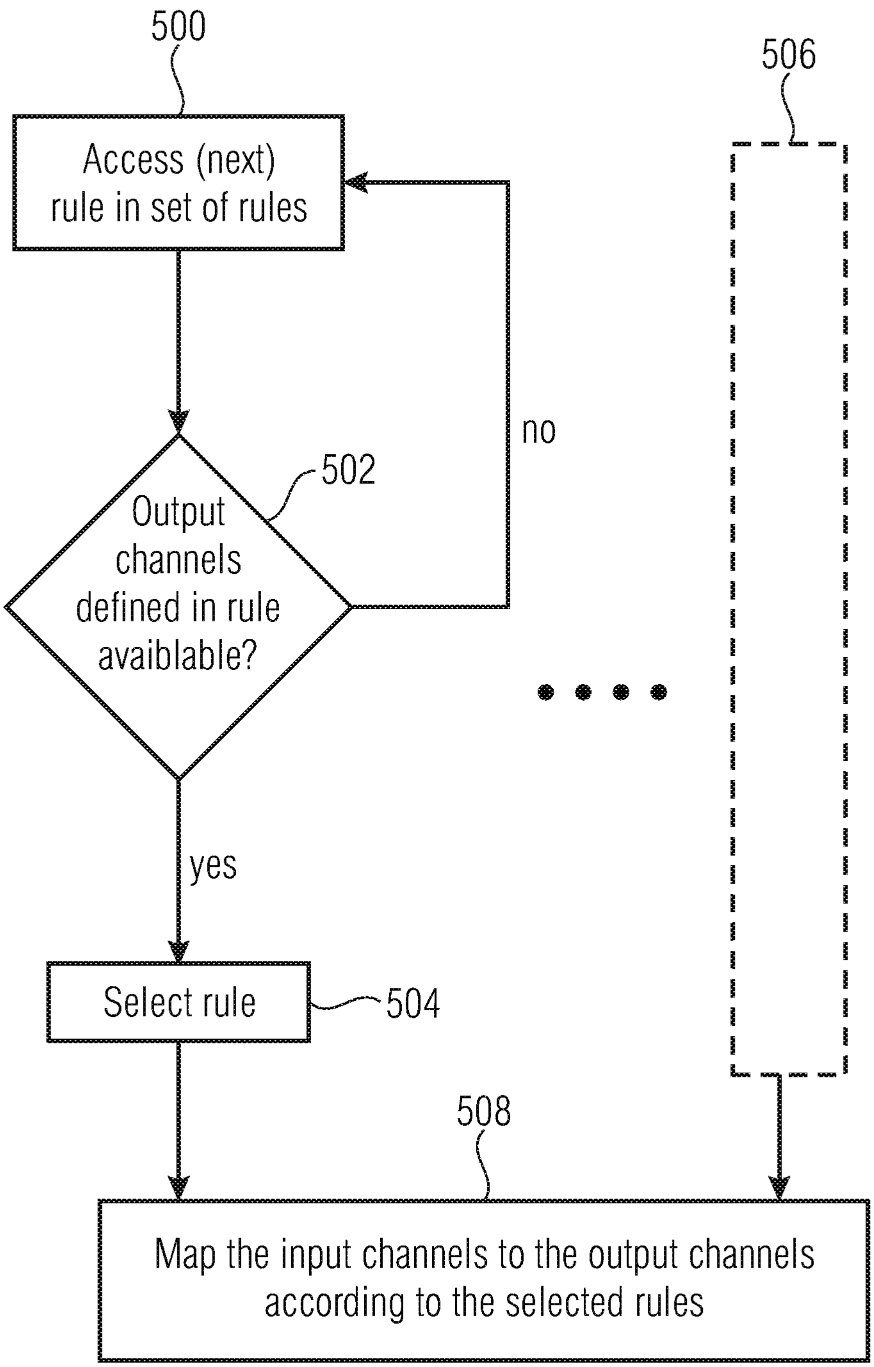
FIG. 7 shows a method for mapping input channels of an input channel configuration to output channels of an output channel configuration.

Accordingly, as shown in FIG. 7, in an embodiment of the method, for an input channel, a rule in the associated set of rules is accessed, step 500. It is determined whether the set of output channels defined in the accessed rules is available in the output channel configuration, step 502. If the set of output channels is available in the output channel configuration, the accessed rule is selected, step 504. If the set of output channels in not available in the output channel configuration, the method jumps back to step 500 and the next rule is accessed. Steps 500 and 502 are performed iteratively until a rule defining a set of output channels matching the output channel configuration is found. In embodiments of the invention, the iterative process may stop when a rule defining an empty set of output channels is encountered so that the corresponding input channel is not mapped at all (or, in other words, is mapped with a coefficient of zero).

Steps 500, 502 and 504 are performed for each input channel of the plurality of input channels of the input channel configuration as indicated by block 506 in FIG. 7. The plurality of input channels may include all input channels of the input channel configuration or may include a subset of the input channels of the input channel configuration of at least two. Then, the input channels are mapped to the output channels according to the selected rules.

Figure 8:
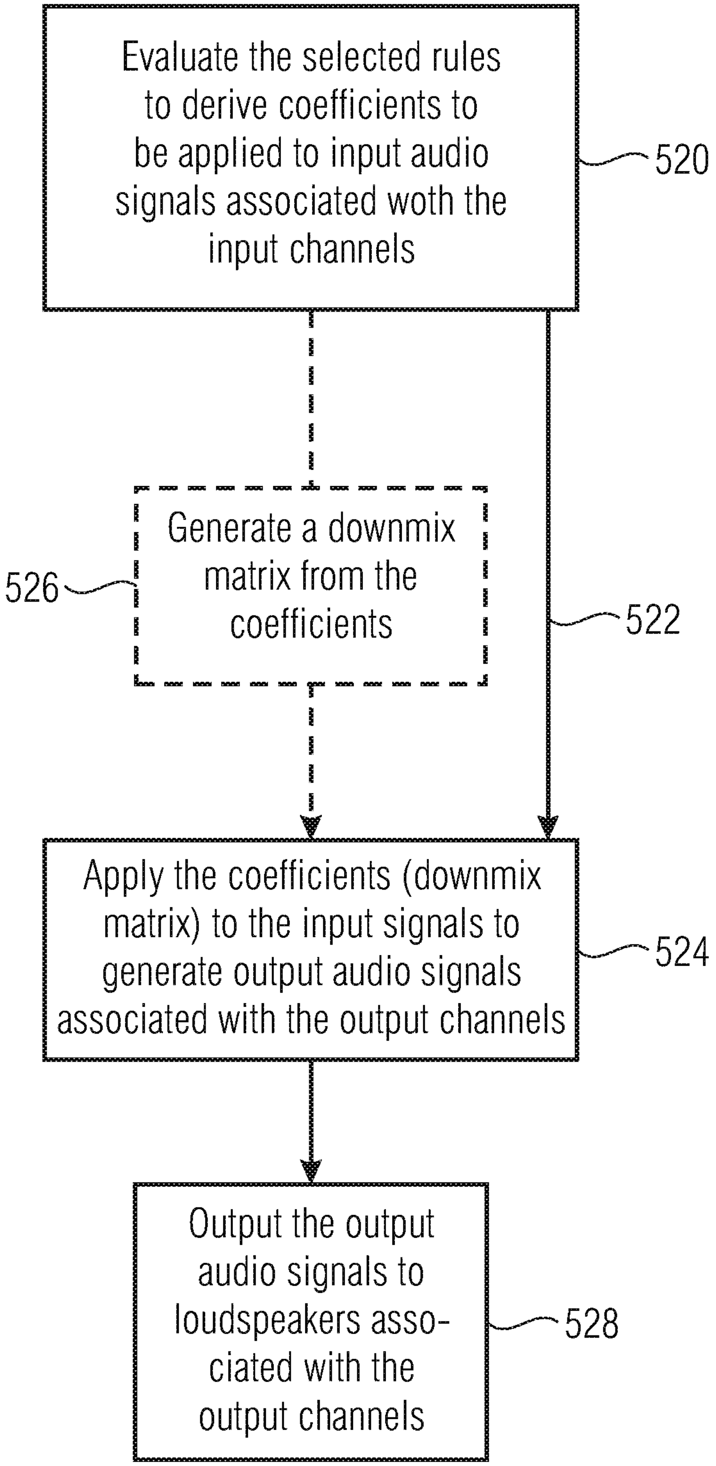
FIG. 8 shows an example of the mapping step in more detail.

As shown in FIG. 8 mapping the input channels to the output channels may comprise evaluating the selected rules to derive coefficients to be applied to input audio signals associated with the input channels, block 520. The coefficients may be applied to the input signals to generate output audio signals associated with the output channels, arrow 522 and block 524. Alternatively, a DMX matrix may be generated from the coefficients, block 526, and the DMX matrix may be applied to the input signals, block 524. Then, the output audio signals may be output to loudspeakers associated with the output channels, block 528.

Thus, selection of rules for given input/output configuration comprises deriving a DMX matrix for a given input and output configuration by selecting appropriate entries from the set of rules that describe how to map each input channel on the output channels that are available in the given output channel configuration. In particular, the system selects only those mapping rules that are valid for the given output setup, i.e. that describe mappings to loudspeaker channels that are available in the given output channel configuration for the particular use case. Rules that describe mappings to output channels that are not existing in the output configuration under consideration are discarded as invalid and can thus not be selected as appropriate rules for the given output configuration.

One example for multiple rules for one input channel is described in the following for the mapping of an elevated center channel (i.e. a channel at azimuth angle 0 degrees and elevation angle larger 0 degrees) to different output loudspeakers. A first rule for the elevated center channel may define a direct mapping to the center channel in the horizontal plane (i.e. to a channel at azimuth angle 0 degrees and elevation angle 0 degrees). A second rule for the elevated center channel may define a mapping of the input signal to the left and right front channels (e.g. the two channels of a stereophonic reproduction system or the left and right channel of a 5.1 surround reproduction system) as a phantom source. E.g. the second rule may map the input channel to the left and right front channels with equal gains such that the reproduced signal is perceived as a phantom source at the center position.

If an input channel (loudspeaker position) of the input channel configuration is present in the output channel configuration as well, the input channel can directly be mapped to the same output channel. This may be reflected in the set of mapping rules by adding a direct one-to-one mapping rule as the first rule. The first rule may be handled before the mapping rules selection. Handling outside the mapping rules determination avoids the need to specify a one-to-one mapping rule for each input channel (e.g. mapping of front-left input at 30 deg. azimuth to front-left output at 30 deg. azimuth) in a memory or database storing the remaining mapping rules. This direct one-to-one mapping can be handled e.g. such that if a direct one-to-one mapping for an input channel is possible (i.e. the relevant output channel exists), the particular input channel is directly mapped to the same output channel without initiating a search in the remaining set of mapping rules for this particular input channel.

In embodiments of the invention, rules are prioritized. During the selection of rules the system tends to use higher prioritized rules rather than lower prioritized rules. This may be implemented by an iteration through a prioritized list of rules for each input channel. For each input channel the system may loop through the ordered list of potential rules for the input channel under consideration until an appropriate valid mapping rule is found, thus stopping at and thus selecting the highest prioritized appropriate mapping rule. Another possibility to implement the prioritization can be to assign cost terms to each rule reflecting the quality impact of the application of the mapping rules (higher cost for lower quality). The system may then run a search algorithm the minimizes the cost terms by selecting the best rules. The use of cost terms also allows to globally minimize the cost terms if rule selections for different input channels may interact with each other. A global minimization of the cost term ensures that the highest output quality is obtained.

The prioritization of the rules can be defined by a system architect, e.g. by filling the list of potential mapping rules in a prioritized order or by assigning cost terms to the individual rules. The prioritization may reflect the achievable sound quality of the output signals: higher prioritized rules are supposed to deliver higher sound quality, e.g. better spatial image, better envelopment than lower prioritized rules. Potentially other aspects may be taken into account in the prioritization of the rules, e.g. complexity aspects. Since different rules result in different DMX matrices, they may ultimately lead to different computational complexities or memory requirements in the DMX process that applies the generated DMX matrix.

The mapping rules selected (such as by selector 402) determine the DMX gains, potentially incorporating geometric information. I.e. a rule for determining the DMX gain value may deliver DMX gain values that depend on the position associated with loudspeaker channels.

Mapping rules may directly define one or several DMX gains, i.e. gain coefficients, as numerical values. The rules may e.g. alternatively define the gains indirectly by specifying that a specific panning law is to be applied, e.g. tangent law panning or VBAP. In that case the DMX gains depend on geometrical data, such as the position or direction relative to the listener, of the input channel as well as the position or direction relative to the listener of the output channel or output channels. The rules may define the DMX gains frequency-dependent. The frequency dependency may be reflected by different gain values for different frequencies or frequency bands or as parametric equalizer parameters, e.g. parameters for shelving filters or second-order sections, that describe the response of a filter that is to be applied to the signal when mapping an input channel to one or several output channels.

In embodiments of the invention, rules are implemented to directly or indirectly define downmix coefficients as downmix gains to be applied to the input channels. However, downmix coefficients are not limited to downmix gains, but may also include other parameters that are applied when mapping input channels to output channels. The mapping rules may be implemented to directly or indirectly define delay values that can be applied to render the input channels by the delay panning technique instead of an amplitude panning technique. Further, delay and amplitude panning may be combined. In this case the mapping rules would allow to determine gain and delay values as downmix coefficients.

In embodiments of the invention, for each input channel the selected rule is evaluated and the derived gains (and/or other coefficients) for mapping to the output channels are transferred to the DMX matrix. The DMX matrix may be initialized with zeros in the beginning such that the DMX matrix is, potentially sparsely, filled with non-zero values when evaluating the selected rules for each input channel.

The rules of the sets of rules may be configured to implement different concepts in mapping the input channels to the output channels. Particular rules or classes of rules and generic mapping concepts that may underlie the rules are discussed in the following.

Generally, the rules allow to incorporate expert knowledge in the automatic generation of downmix coefficients to obtain better quality downmix coefficients than would be obtained from generic mathematical downmix coefficient generators like VBAP-based solutions. Expert knowledge may result from knowledge about psycho-acoustics that reflects the human perception of sound more precise than generic mathematical formulations like generic panning laws. The incorporated expert knowledge may as well reflect the experience in designing down-mix solutions or it may reflect artistic downmixing intents.

Rules may be implemented to reduce excessive panning: A large amount of panned reproduction of input channels is often undesired. Mapping rules may be designed such that they accept directional reproduction errors, i.e. a sound source may be rendered at a wrong position to reduce the amount of panning in return. E.g. a rule may map an input channel to an output channel at a slightly wrong position instead of panning the input channel to the correct position over two or more output channels.

Rules may be implemented to take into account the semantics of the channel under consideration. Channels with different meaning, such as channels carrying specific content may have associated therewith differently tuned rules. One example are rules for mapping the center channel to the output channels: The sound content of the center channel often differs significantly from the content of other channels. E.g. in movies the center channel is predominantly used to reproduce dialogs (i.e. as 'dialog channel'), so that rules concerning the center channel may be implemented with the intention of the perception of the speech as emanating from a near sound source with little spatial source spread and natural sound color. A center mapping rule may thus allow for larger deviation of the reproduced source position than rules for other channels to avoid the need for panning (i.e. phantom source rendering). This ensures the reproduction of the movie dialogs as discrete sources with little spread and more natural sound color than phantom sources.

Other semantic rules may interpret left and right frontal channels as parts of stereo channel pairs. Such rules may aim at reproducing the stereophonic sound image such that it is centered: If the left and right frontal channels are mapped to an asymmetric output setup, left-right asymmetry, the rules may apply correction terms (e.g. correction gains) that ensure a balanced, i.e. centered reproduction of the stereophonic sound image.

Another example that makes use of the channel semantics are rules for surround channels that are often utilized to generate enveloping ambient sound fields (e.g. room reverberation) that do not evoke the perception of sound sources with distinct source position. The exact position of the reproduction of this sound content is thus usually not important. A mapping rule that takes into account the semantics of the surround channels may thus be defined with only low demands on the spatial precision.

Rules may be implemented to reflect the intent to preserve a diversity inherent to the input channel configuration. Such rules may e.g. reproduce an input channel as a phantom source even if there is a discrete output channel available at the position of that phantom source. This deliberate introduction of panning where a panning-free solution would be possible may be advantageous if the discrete output channel and the phantom source are fed with input channels that are (e.g. spatially) diverse in the input channel configuration: The discrete output channel and the phantom source are perceived differently, thus preserving the diversity of the input channels under consideration.

One example for a diversity preserving rule is the mapping from an elevated center channel to a left and right front channel as phantom source at the center position in the horizontal plane, even if a center loudspeaker in the horizontal plane is physically available in the output configuration. The mapping from this example may be applied to preserve the input channel diversity if at the same time another input channel is mapped to the center channel in the horizontal plane. Without the diversity preserving rule both input channels, the elevated center channel as well as the other input channel, would be reproduced through the same signal path, i.e. through the physical center loudspeaker in the horizontal plane, thus losing the input channel diversity.

In addition to make use of a phantom source as explained above, a preservation or emulation of the spatial diversity characteristics inherent to the input channel configuration may be achieved by rules implementing the following strategies. 1. Rules may define an equalization filter applied to an input signal associated with an input channel at an elevated position (higher elevation angle) if mapping the input channel to an output channel at a lower position (lower elevation angle). The equalization filter may compensate for timbre changes of different acoustical channels and may be derived based on empirical expert knowledge and/or measured BRIR data or the like. 2. Rules may define a decorrelation/reverberation filter applied to an input signal associated with an input channel at an elevated position if mapping the input channel to an output channel at a lower position. The filter may be derived from BRIRs measurements or empirical knowledge about room acoustics or the like. The rule may define that the filtered signal is reproduced over multiple loudspeakers, where for each loudspeaker different filter may be applied. The filter may also only model early reflections.

In embodiments of the invention, the selector may take into consideration how other input channels are mapped to one or more output channels when selecting a rule for an input channel. For example, the selector my select a first rule mapping the input channel to a first output channel if no other input channel is mapped to that output channel. In case another input channel is mapped to that output channel, the selector may select another rule mapping the input channel to one or more other output channels with the intent to preserve a diversity inherent to the input channel configuration. For example, the selector may apply the rules implemented for preserving spatial diversity inherent in the input channel configuration in case another input channel is also mapped to the same output channel(s) and may apply another rule else.

Rules may be implemented as timbre preserving rules. In other words, rules may be implemented to account for the fact that different loudspeakers of the output setup are perceived with different coloration by the listener. One reason is the coloration introduced by the acoustic effects of the listener's head, pinnae, and torso. The coloration depends on the angle-of-incidence of sound reaching the listener's ears, i.e. the coloration of sound differs for different loudspeaker positions. Such rules can take into account the different coloration of sound for the input channel position and the output channel position the input channel is mapped to and derive equalizing information that compensates for the undesired differences in coloration, i.e. for the undesired change in timbre. To this end, rules may include an equalizing rule together with a mapping rule determining the mapping from one input channel to the output configuration since the equalizing characteristics usually depend on the particular input and output channels under consideration. Speaking differently, an equalization rule may be associated with some of the mapping rules, wherein both rules together may be interpreted as one rule.

Equalizing rules may result in equalizing information that may e.g. be reflected by frequency dependent downmix coefficients or that may e.g. be reflected by parametric data for equalizing filters that are applied to the signals to obtain the desired timbre preservation effect. One example for a timbre preserving rule is a rule the describes the mapping from an elevated center channel to the center channel in the horizontal plane. The timbre preserving rule would define an equalizing filter that is applied in the downmix process to compensate for the different signal coloration that is perceived by the listener when reproducing a signal over aloudspeaker mounted at the elevated center channel position in contrast to the perceived coloration for a reproduction of the signal over a loudspeaker at the center channel position in the horizontal plane.

Embodiments of the invention provide for a fallback to generic mapping rule. A generic mapping rule may be employed, e.g. a generic VBAP panning of the input configuration positions, that applies if no other more advanced rule is found for a given input channel and given output channel configuration. This generic mapping rule ensures that a valid input/output mapping is found for all possible configurations and that for each input channel at least a basic rendering quality is met. It is to be noted that generally other input channels may be mapped using more refined rules than the fallback rule such that the overall quality of the generated downmix coefficients will be generally higher than (and at least as high as) the quality of coefficients generated by a generic mathematical solution like VBAP. In embodiments of the invention, the generic mapping rule may define mapping of the input channel to one or both output channels of a stereo channel configuration having a left output channel and a right output channel.

In embodiments of the invention, the described procedure, i.e. determination of mapping rules from a set of potential mapping rules, and application of the selected rules by constructing a DMX matrix from them that can be applied in a DMX process, may be altered such that the selected mapping rules may be applied in a DMX process directly without the intermediate formulation of a DMX matrix. E.g. the mapping gains (i.e. DMX gains) determined by the selected rules may be directly applied in a DMX process without the intermediate formulation of a DMX matrix.

The manner in which the coefficients or the downmix matrix are applied to the input signals associated with the input channels is clear for those skilled in the art. The input signal is processed by applying the derived coefficient(s) and the processed signal is output to the loudspeaker associated with the output channel(s) to which the input channel is mapped. If two or more input channels are mapped to the same output channel, the respective signals are added and output to the loudspeaker associated with the output channel.

In a beneficial embodiment the system may be implemented as follows. An ordered list of mapping rules is given. The order reflects the mapping rule prioritization. Each mapping rule determines the mapping from one input channel to one or more output channels, i.e. each mapping rule determines on which output loudspeakers an input channel is rendered. Mapping rules either explicitly define downmix gains numerically. Alternatively they indicate that a panning law has to be evaluated for the considered input and output channels, i.e. the panning law has to be evaluated according to the spatial positions (e.g. azimuth angles) of the considered input and output channels. Mapping rules may additionally specify that an equalizing filter has to be applied to the considered input channel when performing the downmixing process. The equalizing filter may be specified by a filter parameters index that determines which filter from a list of filters to apply. The system may generate a set of downmix coefficients for a given input and output channel configuration as follows. For each input channel of the input channel configuration: a) iterate through the list of mapping rules respecting the order of the list, b) for each rule describing a mapping from the considered input channel determine whether the rule is applicable (valid), i.e. determine whether the output channel(s) the mapping rule considers for rendering are available in the output channel configuration under consideration, c) the first valid rule that is found for the considered input channel determines the mapping from the input channel to the output channel(s), d) after a valid rule has been found the iteration terminates for the considered input channel, e) evaluate the selected rule to determine the downmix coefficients for the considered input channel. Evaluation of the rule may involve the calculation of panning gains and/or may involve determining a filter specification.

The inventive approach for deriving downmix coefficients is advantageous as it provides the possibility to incorporate expert knowledge in the downmix design (like psychoacoustic principles, semantic handling of the different channels, etc.). Compared to purely mathematical approaches (like generic application of VBAP) it thus allows for higher quality downmix output signals when applying the derived downmix coefficients in a downmix application. Compared to manually tuned downmix coefficients, the system allows to automatically derive coefficients for large numbers of input/output configuration combinations without the need for a tuning expert, thus reducing costs. It further allows to derive downmix coefficients in applications where the downmix implementation is already deployed, thus enabling high-quality downmix applications where the input/output configurations may change after the design process, i.e. when no expert tuning of the coefficients is possible.

In the following, a specific non-limiting embodiment of the invention is described in further detail. The embodiment is described referring to a format converter which might implement the format conversion 232 shown in FIG. 2. The format converter described in the following comprises a number of specific features wherein it should be clear that some of the features are optional and, therefore, could be omitted. In the following, it is described as to how the converter is initialized in implementing the invention.

The following specification refers to Tables 1 to 6, which can be found at the end of the specification. The labels used in the tables for the respective channels are to be interpreted as follows: Characters “CH” stand for “Channel”. The character “M” stands for “horizontal listener plane”, i.e. an elevation angle of 0°. This is the plane in which loudspeakers are located in a normal 2D setup such as stereo or 5.1. Character “L” stands for a lower plane, i.e. an elevation angle <0°. Character “U” stands for a higher plane, i.e. an elevation angle >0°, such as 30° as an upper loudspeaker in a 3D setup. Character “T” stands for top channel, i.e. an elevation angle of 90°, which is also known as “voice of god” channel. Located after one of the labels M/L/U/T is a label for left (L) or right (R) followed by the azimuth angle. For example, CH_M_L030 and CH_M_R030 represent the left and right channel of a conventional stereo setup. The azimuth angle and the elevation angle for each channel are indicated in Table 1, except for the LFE channels and the last empty channel.

An input channel configuration and an output channel configuration may include any combination of the channels indicated in Table 1.

Exemplary input/output formats, i.e. input channel configurations and output channel configurations, are shown in Table 2. The input/output formats indicated in Table 2 are standard formats and the designations thereof will be recognized by those skilled in the art.

Table 3 shows a rules matrix in which one or more rules are associated with each input channel (source channel). As can be seen from Table 3, each rule defines one or more output channels (destination channels), which the input channel is to be mapped to. In addition, each rule defines gain value G in the third column thereof. Each rule further defines an EQ index indicating whether an equalization filter is to be applied or not and, if so, which specific equalization filter (EQ index 1 to 4) is to be applied. Mapping of the input channel to one output channel is performed with the gain G given in column 3 of Table 3. Mapping of the input channel to two output channels (indicated in the second column) is performed by applying panning between the two output channels, wherein panning gains $g_1$ and $g_2$ resulting from applying the panning law are additionally multiplied by the gain given by the respective rule (column three in Table 3). Special rules apply for the top channel. According to a first rule, the top channel is mapped to all output channels of the upper plane, indicated by ALL_U, and according to a second (less prioritized) rule, the top channel is mapped to all output channels of the horizontal listener plane, indicated by ALL_M.

Table 3 does not include the first rule associated with each channel, i.e. a direct mapping to a channel having the same direction. This first rule may be checked by the system/algorithm before the rules shown in Table 3 are accessed. Thus, for input channels, for which a direct mapping exists, the algorithm need not access Table 3 to find a matching rule, but applies the direct mapping rule in deriving a coefficient of one to directly map the input channel to the output channel. In such cases, the following description is valid for those channels for which the first rule is not fulfilled, i.e. for which a direct mapping does not exist. In alternative embodiments, the direct mapping rule may be included in the rules table and is not checked prior to accessing the rules table.

Table 4 shows normalized center frequencies of 77 filterbank bands used in the predefined equalizer filters as will be explained in more detail herein below. Table 5 shows equalizer parameters used in the predefined equalizer filters.

Table 6 shows in each row channels which are considered to be above/below each other.

The format converter is initialized before processing input signals, such as audio samples delivered by a core decoder such as the core decoder of decoder 200 shown in FIG. 2. During an initialization phase, rules associated with the input channels are evaluated and coefficients to be applied to the input channels (i.e. the input signals associated with the input channels) are derived.

In the initialization phase the format converter may automatically generate optimized downmixing parameters (like a downmixing matrix) for the given combination of input and output formats. It may apply an algorithm that selects for each input loudspeaker the most appropriate mapping rule from a list of rules that has been designed to incorporate psychoacoustic considerations. Each rule describes the mapping from one input channel to one or several output loudspeaker channels. Input channels are either mapped to a single output channel, or panned to two output channels, or (in case of the ‘Voice of God’ channel) distributed over a larger number of output cannels. The optimal mapping for each input channel may be selected depending on the list of output loudspeakers that are available in the desired output format. Each mapping defines downmix gains for the input channel under consideration as well as potentially also an equalizer that is applied to the input channel under consideration. Output setups with non-standard loudspeaker positions can be signaled to the system by providing the azimuth and elevation deviations from a regular loudspeaker setup. Further, distance variations of the desired target loudspeaker positions are taken into account. The actual downmixing of the audio signals may be performed on a hybrid QMF subband representation of the signals.

Audio signals that are fed into the format converter may be referred to as input signals. Audio signals that are the result of the format conversion process may be referred to as output signals. The audio input signals of the format converter may be audio output signals of the core decoder. Vectors and matrices are denoted by bold-faced symbols. Vector elements or matrix elements are denoted as italic variables supplemented by indices indicating the row/column of the vector/matrix element in the vector/matrix.

The initialization of the format converter may be carried out before processing of the audio samples delivered by the core decoder takes place. The initialization may take into account as input parameters the sampling rate of the audio data to process, a parameter signaling the channel configuration of the audio data to process with the format converter, a parameter signaling the channel configuration of the desired output format, and optionally parameters signaling a deviation of the output loudspeaker positions from a standard loudspeaker setup (random setup functionality). The initialization may return the number of channels of the input loudspeaker configuration, the number of channels of the output loudspeaker configuration, a downmix matrix and equalizing filter parameters that are applied in the audio signal processing of the format converter, and trim gain and delay values to compensate for varying loudspeaker distances In detail, the initialization may take into account the following input parameters:

| Input Parameters | |
|---|---|
| format_in | input format, see Table 2. |
| format_out | output format, see Table 2. |
| $f_s$ | sampling rate of the input signals associated with the input channels (frequency in Hz) |
| $r_{azi,A}$ | for each output channel c, an azimuth angle is specified, determining the deviation from the standard format loudspeaker azimuth. |
| $r_{ele,A}$ | for each output channel c, an elevation angle is specified, determining the deviation from the standard format loudspeaker elevation. |
| $trim_A$ | for each output channel c, the distance of the loudspeaker to the central listening position is specified in meters. |
| $N_{maxdelay}$ | maximum delay that can be used for trim [samples] |

The input format and the output format correspond to the input channel configuration and the output channel configuration. $r_{azi,A}$ and $r_{ele,A}$ represent parameters signaling a deviation of loudspeaker positions (azimuth angle and elevation angle) from a standard loudspeaker setup underlying the rules, wherein A is a channel index. The angles of the channels according to the standard setup are shown in Table 1.

In embodiments of the invention, in which a gain coefficient matrix is derived only, the only input parameter may be format_in and format_out. The other input parameters are optional depending on the features implemented, wherein $f_s$ may be used in initializing one or more equalization filters in case of frequency selective coefficients, $r_{azi,A}$ and $r_{ele,A}$ may be used to take deviations of loudspeaker positions into consideration, and $trim_A$ and $N_{maxdelay}$ may be used to take a distance of the respective loudspeaker from a central listener position into consideration.

In embodiments of the converter, the following conditions may be verified and if the conditions are not met, converter initialization is considered to have failed, and an error is returned. The absolute values of $r_{azi,A}$ and $r_{ele,A}$ shall not exceed 35 and 55 degrees, respectively. The minimum angle between any loudspeaker pair (without LFE channels) shall not be smaller than 15 degrees. The values of $r_{azi,A}$ shall be such that the ordering by azimuth angles of the horizontal loudspeakers does not change. Likewise, the ordering of the height and low loudspeakers shall not change. The values of $r_{ele,A}$ shall be such that the ordering by elevation angles of loudspeakers which are (approximately) above/below each other does not change.

To verify this, the following procedure may be applied:

For each row of Table 6, which contains two or three channels of the output format, do:

Order the channels by elevation without randomization.

Order the channels by elevation with considering randomization.

If the two orderings differ, return an initialization error.

The term "randomization" means that deviations between real scenario channels and standard channels are taken into consideration, i.e. that the deviations $razi_c$ and $rele_c$ are applied to the standard output channel configuration.

The loudspeaker distances in $trim_A$ shall be between 0.4 and 200 meters. The ratio between the largest and smallest loudspeaker distance shall not exceed 4. The largest computed trim delay shall not exceed $N_{maxdelay}$.

If the above conditions are fulfilled, the initialization of the converter is successful.

In embodiments, the format converter initialization returns the following output parameters:

| Output Parameters | |
|---|---|
| $N_{in}$ | number of input channels |
| $N_{out}$ | number of output channels |
| $M_{DMX}$ | downmix matrix [linear gains] |
| $I_{EQ}$ | vector containing the EQ index for each input channel |
| $G_{EQ}$ | matrix containing equalizer gain values for all EQ indices and frequency bands |
| $T_{g,A}$ | trim gain [linear] for each output channel A |
| $T_{d,A}$ | trim delay [samples] for each output channel A |

The following description makes use of intermediate parameters as defined in the following for clarity reasons. It is to be noted that an implementation of the algorithm may omit the introduction of the intermediate parameters.

| | |
|---|---|
| S | vector of converter source channels [input channel indices] |
| D | vector of converter destination channels [output channel indices] |
| G | vector of converter gains [linear] |
| E | vector of converter EQ indices |

The intermediate parameters describe the downmixing parameters in a mapping-oriented way, i.e. as sets of parameters $S_i$, $D_i$, $G_i$, $E_i$ per mapping i.

It goes without saying that in embodiments of the invention the converter will not output all of the above output parameters dependent on which of the features are implemented.

For random loudspeaker setups, i.e. output setups that contain loudspeakers at positions (channel directions) deviating from the desired output format, the position deviations are signaled by specifying the loudspeaker position deviation angles as the input parameters $r_{azi,A}$ and $r_{ele,A}$. Preprocessing is performed by applying $r_{azi,A}$ and $r_{ele,A}$ to the angles of the standard setup. To be more specific, the channels' azimuth and elevation angles in Table 1 are modified by adding $r_{azi,A}$ and $r_{ele,A}$ to the corresponding channels.

$N_{in}$ signals the number of channels of the input channel (loudspeaker) configuration. This number can be taken from Table 2 for the given input parameter format_in. $N_{out}$ signals the number of channels of the output channel (loudspeaker) configuration. This number can be taken from Table 2 for the given input parameter format_out.

The parameter vectors S, D, G, E define the mapping of input channels to output channels. For each mapping i from an input channel to an output channel with non-zero downmix gain they define the downmix gain as well as an equalizer index that indicates which equalizer curve has to be applied to the input channel under consideration in mapping i.

Considering a case, in which input format Format_5_1 is converted into Format_2_0, the following downmix matrix would be obtained (considering a coefficient of 1 for direct mapping, Table 2 and Table 5, and with IN1=CH_M_L030, IN2=CH_M_R030, IN3=CH_M_000, IN4=CH_M_L110, IN5=CH_M_R110, OUT1=CH_M_L030, and OUT2=CH_M_R030):

$$\begin{pmatrix} OUT1 \\ OUT2 \end{pmatrix} = \begin{pmatrix} 1 & 0 & \frac{1}{\sqrt{2}} & 0.8 & 0 \\ 0 & 1 & \frac{1}{\sqrt{2}} & 0 & 0.8 \end{pmatrix} \begin{pmatrix} IN1 \\ IN2 \\ IN3 \\ IN4 \\ IN5 \end{pmatrix}$$

The left vector indicates the output channels, the matrix represents the downmix matrix and the right vector indicates the input channels.

Thus, the downmix matrix includes six entries different from zero and therefore, i runs from 1 to 6 (arbitrary order as long as the same order is uses in each vector). If counting the entries of the downmix matrix from left to right and up to down starting with the first row, the vectors S, D, G and E in this example would be:

S=(IN1, IN3, IN4, IN2, IN3, IN5)

D=(OUT1, OUT1, OUT1, OUT2, OUT2, OUT2)

G=(1, $1/\sqrt{2}$, 0.8, 1, $1/\sqrt{2}$, 0.8)

E=(0, 0, 0, 0, 0, 0)

Accordingly, the i-th entry in each vector relates to the i-th mapping between one input channel and one output channel so that the vectors provide for each channel a set of data including the input channel involved, the output channel involved, the gain value to be applied and which equalizer is to be applied.

In order to compensate for different distances of loudspeakers from a central listener position, $T_{g,A}$ and/or $T_{d,A}$ may be applied to each output channel.

The vectors S, D, G, E are initialized according to the following algorithm:

Firstly, the mapping counter is initialized: i=1

If the input channel also exists in the output format (for example, input channel under consideration is CH_M_R030 and channel CH_M_R030 exists in the output format, then:

$S_i$=index of source channel in input (Example: channel CH_M_R030 in Format_5_2_1 is at second place according to Table 2, i.e. has index 2 in this format)

$D_i$=index of same channel in output $G_i$=1

$E_i$=0 i=i+1

Thus, direct mappings are handled first and an gain coefficient of 1 and an equalizer index of zero is associated to each direct mapping. After each direct mapping, i is increased by one, i=i+1.

For each input channel, for which a direct mapping does not exist, the first entry of this channel in the input column (source column) of Table 3, for which the channel(s) in the corresponding row of the output column (destination column) exist(s), is searched and selected. In other words, the first entry of this channel defining one or more output channels which are all present in the output channel configuration (given by format_out) is searched and selected. For specific rules this may mean, such as for the input channel CH_T_000 defining that the associated input channel is mapped to all output channels having a specific elevation, this may mean that the first rule defining one or more output channels having the specific elevation, which are present in the output configuration, is selected.

Thus, the algorithm proceeds:

Else (i.e. if the input channel does not exist in the output format)

search the first entry of this channel in the Source column of Table 3, for which the channels in the corresponding row of the Destination column exist. The ALL_U destination shall be considered valid (i.e. the relevant output channels exist) if the output format contains at least one "CH_U_" channel. The ALL_M destination shall be considered valid (i.e. the relevant output channels exist) if the output format contains at least one "CH_M_" channel.

Thus, a rule is selected for each input channel. The rule is then evaluated as follows in order to derive the coefficients to be applied to the input channels.

If destination column contains ALL_U, then:

For each output channel x with "CH_U_" in its name, do:

$S_i$=index of source channel in input $D_i$=index of channel x in output $G_i$=(value of gain column)/sqrt(number of "CH_U_" channels)

$E_i$=value of EQ column i=i+1

Else if destination column contains ALL_M, then:

For each output channel x with "CH_M_" in its name, do:

$S_i$=index of source channel in input $D_i$=index of channel x in output $G_i$=(value of gain column)/sqrt(number of "CH_M_" channels)

$E_i$=value of EQ column i=i+1

Else if there is one channel in the Destination column, then:

$S_i$=index of source channel in input $D_i$=index of destination channel in output $G_i$=value of gain column $E_i$=value of EQ column i=i+1

Else (two channels in Destination column)

$S_i$=index of source channel in input $D_i$=index of first destination channel in output $G_i$=(value of Gain column)*$g_1$ $E_i$=value of EQ column i=i+1

$S_i$=$S_{i-1}$ $D_i$=index of second destination channel in output $G_i$=(value of Gain column)*$g_2$ $E_i$=$E_{i-1}$ i=i+1

The gains $g_1$ and $g_2$ are computed by applying tangent law amplitude panning in the following way:

unwrap source destination channel azimuth angles to be positive the azimuth angles of the destination channels are $\alpha_1$ and $\alpha_2$ (see Table 1).

the azimuth angle of the source channel (panning target) is $\alpha_{src}$.

$$\alpha_0 = \frac{|\alpha_1 - \alpha_2|}{2}$$

$$\alpha_{center} = \frac{\alpha_1 + \alpha_2}{2}$$

$$\alpha = (\alpha_{center} - \alpha_{src}) \cdot \operatorname{sgn}(\alpha_2 - \alpha_1)$$

$$g_1 = \frac{g}{\sqrt{1+g^2}},\ g_2 = \frac{1}{\sqrt{1+g^2}} \text{ with}$$

$$g = \frac{\tan\alpha_0 - \tan\alpha + 10^{-10}}{\tan\alpha_0 + \tan\alpha + 10^{-10}}$$

By the above algorithm, the gain coefficients ($G_i$) to be applied to the input channels are derived. In addition it is determined whether an equalizer is to be applied and, if so, which equalizer is to be applied, ($E_i$).

The gain coefficients $G_i$ may be applied to the input channels directly or may be added to a downmix matrix which may be applied to the input channels, i.e. the input signals associated with the input channels.

The above algorithm is merely exemplary. In other embodiments, coefficients may be derived from the rules or based on the rules and may be added to a downmix matrix without defining the specific vectors described above.

Equalizer gain values $G_{EQ}$ may be determined as follows:

$G_{EQ}$ consists of gain values per frequency band k and equalizer index e. Five predefined equalizers are combinations of different peak filters. As can be seen from Table 5, equalizers $G_{EQ,1}$, $G_{EQ,2}$ and $G_{EQ,5}$ include a single peak filter, equalizer $G_{EQ,3}$ includes three peak filters and equalizer $G_{EQ,4}$ includes two peak filters. Each equalizer is a serial cascade of one or more peak filters and a gain:

$$G_{EQ,e}^{k} = 10^{\frac{g}{20}} \prod_{n=1}^{N} \operatorname{peak}(\operatorname{band}(k) \cdot f_s/2, P_{f,n}, P_{Q,n}, P_{g,n})$$

where band(k) is the normalized center frequency of frequency band j, specified in Table 4, $f_s$ is the sampling frequency, and function peak( ) is for negative G $$\operatorname{peak}(b, f, Q, G) = \sqrt{\frac{b^4 + \left(\frac{1}{Q^2} - 2\right)f^2 b^2 + f^4}{b^4 + \left(\frac{10^{\frac{-G}{10}}}{Q^2} - 2\right)f^2 b^2 + f^4}} \qquad \text{Equation 1}$$

and otherwise $$\operatorname{peak}(b, f, Q, G) = \sqrt{\frac{b^4 + \left(\frac{10^{\frac{G}{10}}}{Q^2} - 2\right)f^2 b^2 + f^4}{b^4 + \left(\frac{1}{Q^2} - 2\right)f^2 b^2 + f^4}} \qquad \text{Equation 2}$$

The parameters for the equalizers are specified in Table 5. In the above Equations 1 and 2, b is given by band(k)·$f_s$/2, Q is given by $P_Q$ for the respective peak filter (1 to n), G is given by $P_g$ for the respective peak filter, and f is given by Pr for the respective peak filter.

As an example, the equalizer gain values $G_{EQ,4}$ for the equalizer having the index 4 are calculated with the filter parameters taken from the according row of Table 5. Table 5 lists two parameter sets for peak filters for $G_{EQ,4}$, i.e. sets of parameters for n=1 and n=2. The parameters are the peak-frequency $P_f$ in Hz, the peak filter quality factor $P_Q$, the gain $P_g$ (in dB) that is applied at the peak-frequency, and an overall gain g in dB that is applied to the cascade of the two peak filters (cascade of filters for parameters n=1 and n=2).

Thus $$\begin{aligned} G_{EQ,4} &= 10^{\frac{-3.1}{20}} \cdot \operatorname{peak}(\operatorname{band}(k) \cdot f_s/2, P_{f,1}, P_{Q,1}, P_{g,1}) \cdot \\ &\quad \operatorname{peak}(\operatorname{band}(k) \cdot f_s/2, P_{f,2}, P_{Q,2}, P_{g,2}) = \\ &\quad 10^{\frac{-3.1}{20}} \cdot \operatorname{peak}(\operatorname{band}(k) \cdot f_s/2, 5000, 1.0, 4.5) \cdot \\ &\quad \operatorname{peak}(\operatorname{band}(k) \cdot f_s/2, 1100, 0.8, 1.8) = 10^{\frac{-3.1}{20}} \cdot \end{aligned}$$

$$\sqrt{\frac{b^4 + \left(\frac{10^{\frac{4.5}{10}}}{1^2} - 2\right)5000^2 b^2 + 5000^4}{b^4 + \left(\frac{1}{1^2} - 2\right)5000^2 b^2 + 5000^4}} \cdot \sqrt{\frac{b^4 + \left(\frac{10^{\frac{1.8}{10}}}{0.8^2} - 2\right)1100^2 b^2 + 1100^4}{b^4 + \left(\frac{1}{0.8^2} - 2\right)1100^2 b^2 + 1100^4}}$$

The equalizer definition as stated above defines zero-phase gains $G_{EQ,4}$ independently for each frequency band k. Each band k is specified by its normalized center frequency band(k) where 0<=band<=1. Note that the normalized frequency band=1 corresponds to the unnormalized frequency $f_s$/2, where $f_s$ denotes the sampling frequency. Therefore band(k)·$f_s$/2 denotes the unnormalized center frequency of band k in Hz.

The trim delays $T_{d,A}$ in samples for each output channel A and trim gains $T_{g,A}$ (linear gain value) for each output channel A are computed as a function of the loudspeaker distances in $trim_A$:

$$T_{d,c} = \operatorname{round}\left(-\frac{trim_A - \max_n trim_n}{340/f_s}\right)$$

$$T_{g,c} = \frac{\sqrt{trim_A}}{\sqrt{\max_n trim_n}}$$

where $\max_n trim_n$ represents the maximum $trim_A$ of all output channels.

If the largest $T_{d,A}$ exceeds $N_{maxdelay}$, then initialization may fail and an error may be returned.

Deviations of the output setup from a standard setup may be taken into consideration as follows.

Azimuth deviations $r_{azi,A}$ (azimuth deviations) are taken into consideration by simply by applying $r_{azi,A}$ to the angles of the standard setup as explained above. Thus, the modified angles are used when panning an input channel to two output channels. Thus, $r_{azi,A}$ is taken into consideration when one input channel is mapped to two or more output channels when performing panning which is defined in the respective rule. In alternative embodiments, the respective rules may define the respective gain values directly (i.e. the panning has already been performed in advance). In such embodiments, the system may be adapted to recalculate the gain values based on the randomized angles.

Elevation deviations $r_{ele,A}$ may be taken into consideration in a post-processing as follows. Once the output parameters are computed, they may be modified related to the specific random elevation angles. This step has only to be carried out, if not all $r_{ele,A}$ are zero.

For each element i in $D_i$, do:

if output channel with index $D_i$ is a horizontal channel by definition (i.e. output channel label contains the label '_M_'), and if this output channel is now a height channel (elevation in range 0 . . . 60 degrees), and if input channel with index $S_i$ is a height channel (i.e. label contains '_U_'), then h=min(elevation of randomized output channel, 35)/35

$$G_{comp} = h \cdot \frac{1}{0.85} + (1 - h)$$

Define new equalizer with a new index e, where $$G_{EQ,e}^{k} = G_{comp}(h + (1-h) \cdot G_{EQ,E_i}^{k})$$

$E_i$=e else if input channel with index $S_i$ is a horizontal channel (label contains '_M_')

h=min(elevation of randomized output channel, 35)/35

Define new equalizer with a new index e, where $$G_{EQ,e}^{k} = h \cdot G_{EQ,5}^{k} + (1-h) \cdot G_{EQ,E_i}^{k}$$

$E_i$=e h is a normalized elevation parameter indicating the elevation of a nominally horizontal output channel ('_M_') due to a random setup elevation offset $r_{ele,A}$. For zero elevation offset h=0 follows and effectively no post-processing is applied.

The rules table (Table 3) in general applies a gain of 0.85 when mapping an upper input channel ('_U_' in channel label) to one or several horizontal output channels ('_M_' in channel label(s)). In case the output channel gets elevated due to a random setup elevation offset $r_{ele,A}$, the gain of 0.85 is partially (0<h<1) or fully (h=1) compensated for by scaling the equalizer gains by the factor $G_{comp}$ that approaches 1/0.85 for h approaching h=1.0. Similarly the equalizer definitions fade towards a flat EQ-curve ($G_{EQ,e}^{k}=G_{comp}$) for h approaching h=1.0.

In case a horizontal input channel gets mapped to an output channel that gets elevated due to a random setup elevation offset $r_{ele,A}$, the equalizer $G_{EQ,5}^{k}$ is partially (0<h<1) or fully (h=1) applied.

By this procedure, gain values different from 1 and equalizers, which are applied due to mapping an input channel to a lower output channel, are modified in case the randomized output channel is higher than the setup output channel.

According to the above description, gain compensation is applied to the equalizer directly. In an alternative approach the downmix coefficients $G_i$ may be modified. For such an alternative approach, the algorithm for applying gain compensation would be as follows:

if output channel with index $D_i$ is a horizontal channel by definition (i.e. output channel label contains the label '_M_'), and if this output channel is now a height channel (elevation in range 0 . . . 60 degrees), and if input channel with index $S_i$ is a height channel (i.e. label contains '_U_'), then h=min(elevation of randomized output channel, 35)/35

$G_i$=h $G_i$/0.85+(1−h) $G_i$

Define new equalizer with a new index e, where $$G_{EQ,e}^{k} = h + (1-h) \cdot G_{EQ,E_i}^{k}$$

$E_i$=e else if input channel with index $S_i$ is a horizontal channel (label contains '_M_')

h=min(elevation of randomized output channel, 35)/35

Define new equalizer with a new index e, where $$G_{EQ,e}^{k} = h \cdot G_{EQ,5}^{k} + (1-h) G_{EQ,e}^{k}$$

$E_i$=e

As an example, let $D_i$ be the channel index of the output channel for the i-th mapping from an input channel to an output channel. E.g. for the output format FORMAT_5_1 (see Table 2), $D_i$=3 would refer to the center channel CH_M_000. Consider $r_{ele,A}$=35 degrees (i.e. $r_{ele,A}$ of the output channel for the i-th mapping) for an output channel $D_i$ that is nominally a horizontal output channel with elevation 0 degrees (i.e. a channel with label 'CH_M_'). After applying $r_{ele,A}$ to the output channel (by adding $r_{ele,A}$ to the respective standard setup angle such as that defined in Table 1) the output channel $D_i$ has now an elevation of 35 degrees. If an upper input channel (with label 'CH_U') is mapped to this output channel $D_i$, the parameters for this mapping obtained from evaluating the rules as described above will be modified as follows:

The normalized elevation parameter is calculated as h=min(35,35)/35=35/35=1.0. Thus $G_{i,post\text{-}processed}$= $G_{i,before\ post\text{-}processing}$/0.85.

A new, unused index e (e.g. e=6) is defined for the modified equalizer $G_{EQ,6}^{k}$ that is calculated according to $G_{EQ,6}^{k}$=1.0+(1.0−1.0)$G_{EQ,e}^{k}$=1.0+0=1.0. $G_{EQ,6}^{k}$ may be attributed to the mapping rule by setting $E_i$=e=6.

Thus for the mapping of the input channel to the elevated (previously horizontal) output channel $D_i$ the gains have been scaled by a factor of 1/0.85 and the equalizer has been replaced by an equalizer curve with constant gain=1.0 (i.e. with a flat frequency response). This is the intended result since an upper channel has been mapped to an effectively upper output channel (the nominally horizontal output channel became effectively an upper output channel due to the application of the random setup elevation offset of 35 degrees).

Thus, in embodiments of the invention, the method and the signal processing unit are configured to take into consideration deviations of the azimuth angle and the elevation angle of output channels from a standard setup (wherein the rules have been designed based on the standard setup). The deviations taken into consideration either by modifying the calculation of the respective coefficients and/or by recalculating/modifying coefficients which have been calculated before or which are defined in the rules explicitly. Thus, embodiments of the invention can deal with different output setups deviating from standard setups.

The initialization output parameters $N_{in}$, $N_{out}$, $T_{g,A}$, $T_{d,A}$, $G_{EQ}$ may be derived as described above. The remaining initialization output parameters $M_{DMX}$, $I_{EQ}$ may be derived by rearranging the intermediate parameters from the mapping-oriented representation (enumerated by mapping counter i) to a channel-oriented representation as defined in the following:

Initialize $M_{DMX}$ as an $N_{out} \times N_{in}$ zero matrix.

For each i (i in ascending order) do:

$M_{DMX,A,B}=G_i$ with $A=D_i$, $B=S_i$ (A, B being channel indices)

$I_{EQ,A}=E_i$ with $A=S_i$ where $M_{DMX,A,B}$ denotes the matrix element in the Ath row and Bth column of $M_{DMX}$ and $I_{EQ,A}$ denotes the Ath element of vector $I_{EQ}$.

Different specific rules and prioritizations of rules designed to deliver a higher sound quality can be derived from Table 3. Examples will be given in the following.

A rule defining mapping of the input channel to one or more output channels having a lower direction deviation from the input channel in a horizontal listener plane is higher prioritized than a rule defining mapping of the input channel to one or more output channels having a higher direction deviation from the input channel in the horizontal listener plane. Thus, the direction of the loudspeakers in the input setup is reproduced as exact as possible. A rule defining mapping an input channel to one or more output channels having a same elevation angle as the input channel is higher prioritized than a rule defining mapping of the input channel to one or more output channels having an elevation angle different from the elevation angle of the input channel. Thus, the fact that signals stemming from different elevations are perceived differently by a user is considered.

One rule of a set of rules associated with an input channel having a direction different from a front center direction may define mapping the input channel to two output channels located on the same side of the front center direction as the input channel and located on both sides of the direction of the input channel, and another less prioritized rule of that set or rules defines mapping the input channel to a single output channel located on the same side of the front center direction as the input channel. One rule of a set or rules associated with an input channel having an elevation angle of 90° may define mapping the input channel to all available output channels having a first elevation angle lower than the elevation angle of the input channel, and another less prioritized rule of that set or rules defines mapping the input channel to all available output channels having a second elevation angle lower than the first elevation angle. One rule of a set of rules associated with an input channel comprising a front center direction may define mapping the input channel to two output channels, one located on the left side of the front center direction and one located on the right side of the front center direction. Thus, rules may be designed for specific channels in order to take specific properties and/or semantics of the specific channels into consideration.

A rule of a set or rules associated with an input channel comprising a rear center direction may define mapping the input channel to two output channels, one located on the left side of a front center direction and one located on the right side of the front center direction, wherein the rule further defines using a gain coefficient of less than one if an angle of the two output channels relative to the rear center direction is more than 90°. A rule of a set of rules associated with an input channel having a direction different from a front center direction may define using a gain coefficient of less than one in mapping the input channel to a single output channel located on the same side of the front center direction as the input channel, wherein an angle of the output channel relative to a front center direction is less than an angle of the input channel relative to the front center direction. Thus, a channel can be mapped to one or more channels located further ahead to reduce the perceptibility of a non-ideal spatial rendering of the input channel. Further, it may help to reduce the amount of ambient sound in the downmix, which is a desired feature. Ambient sound may be predominantly present in rear channels.

A rule defining mapping an input channel having an elevation angle to one or more output channels having an elevation angle lower than the elevation angle of the input channel may define using a gain coefficient of less than one. A rule defining mapping an input channel having an elevation angle to one or more output channels having an elevation angle lower than the elevation angle of the input channel may define applying a frequency selective processing using an equalization filter. Thus, the fact that elevated channels are generally perceived in a manner different from horizontal or lower channels may be taken into consideration when mapping an input channel to one or more output channels.

In general, input channels that are mapped to output channels that deviate from the input channel position may be attenuated the more the larger the perception of the resulting reproduction of the mapped input channel deviates from the perception of the input channel, i.e. an input channel may be attenuated depending on the degree of imperfection of the reproduction over the available loudspeakers.

Frequency selective processing may be achieved by using an equalization filter. For example, elements of a downmix matrix may be modified in a frequency dependent manner. For example, such a modification may be achieved by using different gain factors for different frequency bands so that the effect of the application of an equalization filter is achieved.

To summarize, in embodiments of the invention a prioritized set of rules describing mappings from input channels to output channels is given. It may be defined by a system designer at the design stage of the system, reflecting expert downmix knowledge. The set may be implemented as an ordered list. For each input channel of the input channel configuration the system selects an appropriate rule of the set of mapping rules depending on the input channel configuration and the output channel configuration of the given use case. Each selected rule determines the downmix coefficient (or coefficients) from one input channel to one or several output channels. The system may iterate through the input channels of the given input channel configuration and compile a downmix matrix from the downmix coefficients derived by evaluating the selected mapping rules for all input channels. The rules selection takes into account the rules prioritization, thus optimizing the system performance e.g. to obtain highest downmix output quality when applying the derived downmix coefficients. Mapping rules may take into account psycho-acoustic or artistic principles that are not reflected in purely mathematical mapping algorithms like VBAP. Mapping rules may take into account the channel semantics e.g. apply a different handling for the center channel or a left/right channel pair. Mapping rules may reduce the amount of panning by allowing for angle errors in the rendering. Mapping rules may deliberately introduce phantom sources (e.g. by VBAP rendering) even if a single corresponding output loudspeaker would be available. The intention to do so may be to preserve the diversity inherent in the input channel configuration.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus. In embodiments of the invention, the methods described herein are processor-implemented or computer-implemented.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, programmed to, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

TABLE 1

Channels with corresponding azimuth and elevation angles

| Channel | Azimuth [deg] | Elevation [deg] |
|---|---|---|
| CH_M_000 | 0 | 0 |
| CH_M_L030 | +30 | 0 |
| CH_M_R030 | −30 | 0 |
| CH_M_L060 | +60 | 0 |
| CH_M_R060 | −60 | 0 |
| CH_M_L090 | +90 | 0 |
| CH_M_R090 | −90 | 0 |
| CH_M_L110 | +110 | 0 |
| CH_M_R110 | −110 | 0 |
| CH_M_L135 | +135 | 0 |
| CH_M_R135 | −135 | 0 |
| CH_M_180 | 180 | 0 |
| CH_U_000 | 0 | +35 |
| CH_U_L045 | +45 | +35 |
| CH_U_R045 | −45 | +35 |
| CH_U_L030 | +30 | +35 |
| CH_U_R030 | −30 | +35 |
| CH_U_L090 | +90 | +35 |
| CH_U_R090 | −90 | +35 |
| CH_U_L110 | +110 | +35 |
| CH_U_R110 | −110 | +35 |
| CH_U_L135 | +135 | +35 |
| CH_U_R135 | −135 | +35 |
| CH_U_180 | 180 | +35 |
| CH_T_000 | 0 | +90 |
| CH_L_000 | 0 | −15 |
| CH_L_L045 | +45 | −15 |
| CH_L_R045 | −45 | −15 |
| CH_LFE1 | n/a | n/a |
| CH_LFE2 | n/a | n/a |
| CH_EMPTY | n/a | n/a |

TABLE 2

Formats with corresponding number of channels and channel ordering

| Input/Output Format | Number of Channels | Channels (with ordering) |
|---|---|---|
| FORMAT_2_0 | 2 | CH_M_L030, CH_M_R030 |
| FORMAT_5_1 | 6 | CH_M_L030, CH_M_R030, CH_M_000, CH_LFE1, CH_M_L110, CH_M_R110 |

TABLE 2-continued

| Formats with corresponding number of channels and channel ordering | | |
|---|---|---|
| Input/Output Format | Number of Channels | Channels (with ordering) |
| FORMAT_5_2_1 | 8 | CH_M_L030, CH_M_R030, CH_M_000, CH_LFE1, CH_M_L110, CH_M_R110, CH_U_L030, CH_U_R030 |
| FORMAT_7_1 | 8 | CH_M_L030, CH_M_R030, CH_M_000, CH_LFE1, CH_M_L110, CH_M_R110, CH_M_L135, CH_M_R135 |
| FORMAT_7_1_ALT | 8 | CH_M_L030, CH_M_R030, CH_M_000, CH_LFE1, CH_M_L110, CH_M_R110, CH_M_L060, CH_M_R060 |
| FORMAT_8_1 | 9 | CH_M_L030, CH_M_R030, CH_U_000, CH_LFE1, CH_M_L110, CH_M_R110, CH_U_L030, CH_U_R030, CH_L_000 |
| FORMAT_10_1 | 11 | CH_M_L030, CH_M_R030, CH_M_000, CH_LFE1, CH_M_L110, CH_M_R110, CH_U_L030, CH_U_R030, CH_U_L110, CH_U_R110, CH_T_000 |
| FORMAT_22_2 | 24 | CH_M_L060, CH_M_R060, CH_M_000, CH_LFE1, CH_M_L135, CH_M_R135, CH_M_L030, CH_M_R030, CH_M_180, CH_LFE2, CH_M_L090, CH_M_R090, CH_U_L045, CH_U_R045, CH_U_000, CH_T_000, CH_U_L135, CH_U_R135, CH_U_L090, CH_U_R090, CH_U_180, CH_L_000, CH_L_L045, CH_L_R045 |
| FORMAT_9_1 | 10 | CH_M_L030, CH_M_R030, CH_M_000, CH_LFE1, CH_M_L110, CH_M_R110, CH_U_L030, CH_U_R030, CH_U_L110, CH_U_R110 |
| FORMAT_9_0 | 9 | CH_M_L030, CH_M_R030, CH_M_000, CH_M_L110, CH_M_R110, CH_U_L030, CH_U_R030, CH_U_L110, CH_U_R110 |
| FORMAT_11_1 | 12 | CH_M_L030, CH_M_R030, CH_M_000, CH_LFE1, CH_M_L110, CH_M_R110, CH_U_L030, CH_U_R030, CH_U_L110, CH_U_R110, CH_T_000, CH_U_000 |
| FORMAT_12_1 | 13 | CH_M_L030, CH_M_R030, CH_M_000, CH_LFE2, CH_M_L135, CH_M_R135, CH_U_L030, CH_U_R030, CH_U_L135, CH_U_R135, CH_T_000, CH_M_L090, CH_M_R090 |
| FORMAT_4_4_0 | 8 | CH_M_L030, CH_M_R030, CH_M_L110, CH_M_R110, CH_U_L030, CH_U_R030, CH_U_L110, CH_U_R110 |
| FORMAT_4_4_T_0 | 9 | CH_M_L030, CH_M_R030, CH_M_L110, CH_M_R110, CH_U_L030, CH_U_R030, CH_U_L110, CH_U_R110, CH_T_000 |
| FORMAT_14_0 | 14 | CH_M_L030, CH_M_R030, CH_M_000, CH_M_L135, CH_M_R135, CH_U_000, CH_U_L045, CH_U_R045, CH_U_L090, CH_U_R090, CH_U_L135, CH_U_R135, CH_U_180, CH_T_000, |
| FORMAT_15_1 | 16 | CH_M_L030, CH_M_R030, CH_M_000, CH_M_L060, CH_M_R060, CH_M_L110, CH_M_R110, CH_M_L135, CH_M_R135, CH_U_L030, CH_U_R030, CH_U_L045, CH_U_R045, CH_U_L110, CH_U_R110, CH_LFE1 |

TABLE 3

| Converter Rules Matrix. | | | |
|---|---|---|---|
| Input (Source) | Output (Destination) | Gain | EQ index |
| CH_M_000 | CH_M_L030, CH_M_R030 | 1.0 | 0 (off) |
| CH_M_L060 | CH_M_L030, CH_M_L110 | 1.0 | 0 (off) |
| CH_M_L060 | CH_M_L030 | 0.8 | 0 (off) |
| CH_M_R060 | CH_M_R030, CH_M_R110, | 1.0 | 0 (off) |
| CH_M_R060 | CH_M_R030, | 0.8 | 0 (off) |
| CH_M_L090 | CH_M_L030, CH_M_L110 | 1.0 | 0 (off) |
| CH_M_L090 | CH_M_L030 | 0.8 | 0 (off) |
| CH_M_R090 | CH_M_R030, CH_M_R110 | 1.0 | 0 (off) |
| CH_M_R090 | CH_M_R030 | 0.8 | 0 (off) |
| CH_M_L110 | CH_M_L135 | 1.0 | 0 (off) |
| CH_M_L110 | CH_M_L030 | 0.8 | 0 (off) |
| CH_M_R110 | CH_M_R135 | 1.0 | 0 (off) |
| CH_M_R110 | CH_M_R030 | 0.8 | 0 (off) |
| CH_M_L135 | CH_M_L110 | 1.0 | 0 (off) |

TABLE 3-continued

| Converter Rules Matrix. | | | |
|---|---|---|---|
| Input (Source) | Output (Destination) | Gain | EQ index |
| CH_M_L135 | CH_M_L030 | 0.8 | 0 (off) |
| CH_M_R135 | CH_M_R110 | 1.0 | 0 (off) |
| CH_M_R135 | CH_M_R030 | 0.8 | 0 (off) |
| CH_M_180 | CH_M_R135, CH_M_L135 | 1.0 | 0 (off) |
| CH_M_180 | CH_M_R110, CH_M_L110 | 1.0 | 0 (off) |
| CH_M_180 | CH_M_R030, CH_M_L030 | 0.6 | 0 (off) |
| CH_U_000 | CH_U_L030, CH_U_R030 | 1.0 | 0 (off) |
| CH_U_000, | CH_M_L030, CH_M_R030 | 0.85 | 0 (off) |
| CH_U_L045 | CH_U_L030 | 1.0 | 0 (off) |
| CH_U_L045 | CH_M_L030 | 0.85 | 1 |
| CH_U_R045 | CH_U_R030 | 1.0 | 0 (off) |
| CH_U_R045 | CH_M_R030 | 0.85 | 1 |
| CH_U_L030 | CH_U_L045 | 1.0 | 0 (off) |
| CH_U_L030 | CH_M_L030 | 0.85 | 1 |

TABLE 3-continued

| Converter Rules Matrix. | | | |
|---|---|---|---|
| Input (Source) | Output (Destination) | Gain | EQ index |
| CH_U_R030 | CH_U_R045 | 1.0 | 0 (off) |
| CH_U_R030 | CH_M_R030 | 0.85 | 1 |
| CH_U_L090 | CH_U_L030, CH_U_L110 | 1.0 | 0 (off) |
| CH_U_L090 | CH_U_L030, CH_U_L135 | 1.0 | 0 (off) |
| CH_U_L090 | CH_U_L045 | 0.8 | 0 (off) |
| CH_U_L090 | CH_U_L030 | 0.8 | 0 (off) |
| CH_U_L090 | CH_M_L030, CH_M_L110 | 0.85 | 2 |
| CH_U_L090 | CH_M_L030 | 0.85 | 2 |
| CH_U_R090 | CH_U_R030, CH_U_R110 | 1.0 | 0 (off) |
| CH_U_R090 | CH_U_R030, CH_U_R135 | 1.0 | 0 (off) |
| CH_U_R090 | CH_U_R045 | 0.8 | 0 (off) |
| CH_U_R090 | CH_U_R030 | 0.8 | 0 (off) |
| CH_U_R090 | CH_M_R030, CH_M_R110 | 0.85 | 2 |
| CH_U_R090 | CH_M_R030 | 0.85 | 2 |
| CH_U_L110 | CH_U_L135 | 1.0 | 0 (off) |
| CH_U_L110 | CH_U_L030 | 0.8 | 0 (off) |
| CH_U_L110 | CH_M_L110 | 0.85 | 2 |
| CH_U_L110 | CH_M_L030 | 0.85 | 2 |
| CH_U_R110 | CH_U_R135 | 1.0 | 0 (off) |
| CH_U_R110 | CH_U_R030 | 0.8 | 0 (off) |
| CH_U_R110 | CH_M_R110 | 0.85 | 2 |
| CH_U_R110 | CH_M_R030 | 0.85 | 2 |
| CH_U_L135 | CH_U_L110 | 1.0 | 0 (off) |
| CH_U_L135 | CH_U_L030 | 0.8 | 0 (off) |
| CH_U_L135 | CH_M_L110 | 0.85 | 2 |
| CH_U_L135 | CH_M_L030 | 0.85 | 2 |
| CH_U_R135 | CH_U_R110 | 1.0 | 0 (off) |
| CH_U_R135 | CH_U_R030 | 0.8 | 0 (off) |
| CH_U_R135 | CH_M_R110 | 0.85 | 2 |
| CH_U_R135 | CH_M_R030 | 0.85 | 2 |
| CH_U_180 | CH_U_R135, CH_U_L135 | 1.0 | 0 (off) |
| CH_U_180 | CH_U_R110, CH_U_L110 | 1.0 | 0 (off) |
| CH_U_180 | CH_M_180 | 0.85 | 2 |
| CH_U_180 | CH_M_R110, CH_M_L110 | 0.85 | 2 |
| CH_U_180 | CH_U_R030, CH_U_L030 | 0.8 | 0 (off) |
| CH_U_180 | CH_M_R030, CH_M_L030 | 0.85 | 2 |
| CH_T_000 | ALL_U | 1.0 | 3 |
| CH_T_000 | ALL_M | 1.0 | 4 |
| CH_L_000 | CH_M_000 | 1.0 | 0 (off) |
| CH_L_000 | CH_M_L030, CH_M_R030 | 1.0 | 0 (off) |
| CH_L_000 | CH_M_L030, CH_M_R060 | 1.0 | 0 (off) |
| CH_L_000 | CH_M_L060, CH_M_R030 | 1.0 | 0 (off) |
| CH_L_L045 | CH_M_L030 | 1.0 | 0 (off) |
| CH_L_R045 | CH_M_R030 | 1.0 | 0 (off) |
| CH_LFE1 | CH_LFE2 | 1.0 | 0 (off) |
| CH_LFE1 | CH_M_L030, CH_M_R030 | 1.0 | 0 (off) |
| CH_LFE2 | CH_LFE1 | 1.0 | 0 (off) |
| CH_LFE2 | CH_M_L030, CH_M_R030 | 1.0 | 0 (off) |

TABLE 4

| Normalized Center Frequencies of the 77 Filterbank Bands Normalized Frequency [0, 1] |
|---|
| 0.00208330 |
| 0.00587500 |
| 0.00979170 |
| 0.01354200 |
| 0.01691700 |
| 0.02008300 |
| 0.00458330 |
| 0.00083333 |
| 0.03279200 |
| 0.01400000 |
| 0.01970800 |
| 0.02720800 |
| 0.03533300 |
| 0.04283300 |
| 0.04841700 |
| 0.02962500 |
| 0.05675000 |
| 0.07237500 |
| 0.08800000 |

TABLE 4-continued

| Normalized Center Frequencies of the 77 Filterbank Bands Normalized Frequency [0, 1] |
|---|
| 0.10362000 |
| 0.11925000 |
| 0.13487000 |
| 0.15050000 |
| 0.16612000 |
| 0.18175000 |
| 0.19737000 |
| 0.21300000 |
| 0.22862000 |
| 0.24425000 |
| 0.25988000 |
| 0.27550000 |
| 0.29113000 |
| 0.30675000 |
| 0.32238000 |
| 0.33800000 |
| 0.35363000 |
| 0.36925000 |
| 0.38488000 |
| 0.40050000 |
| 0.41613000 |
| 0.43175000 |
| 0.44738000 |
| 0.46300000 |
| 0.47863000 |
| 0.49425000 |
| 0.50987000 |
| 0.52550000 |
| 0.54112000 |
| 0.55675000 |
| 0.57237000 |
| 0.58800000 |
| 0.60362000 |
| 0.61925000 |
| 0.63487000 |
| 0.65050000 |
| 0.66612000 |
| 0.68175000 |
| 0.69737000 |
| 0.71300000 |
| 0.72862000 |
| 0.74425000 |
| 0.75987000 |
| 0.77550000 |
| 0.79112000 |
| 0.80675000 |
| 0.82237000 |
| 0.83800000 |
| 0.85362000 |
| 0.86925000 |
| 0.88487000 |
| 0.90050000 |
| 0.91612000 |
| 0.93175000 |
| 0.94737000 |
| 0.96300000 |
| 0.97454000 |
| 0.99904000 |

TABLE 5

| Equalizer Parameters | | | | |
|---|---|---|---|---|
| Equalizer | $P_f$[Hz] | $P_Q$ | $P_g$[dB] | g [dB] |
| $G_{EQ,1}$ | 12000 | 0.3 | −2 | 1.0 |
| $G_{EQ,2}$ | 12000 | 0.3 | −3.5 | 1.0 |
| $G_{EQ,3}$ | 200, 1300, 600 | 0.3, 0.5, 1.0 | −6.5, 1.8, 2.0 | 0.7 |
| $G_{EQ,4}$ | 5000, 1100 | 1.0, 0.8 | 4.5, 1.8 | −3.1 |
| $G_{EQ,5}$ | 35 | 0.25 | −1.3 | 1.0 |

TABLE 6

| Each row lists channels which are considered to be above/below each other | | |
|---|---|---|
| CH_L_000 | CH_M_000 | CH_U_000 |
| CH_L_L045 | CH_M_L030 | CH_U_L030 |
| CH_L_L045 | CH_M_L030 | CH_U_L045 |
| CH_L_L045 | CH_M_L060 | CH_U_L030 |
| CH_L_L045 | CH_M_L060 | CH_U_L045 |
| CH_L_R045 | CH_M_R030 | CH_U_R030 |
| CH_L_R045 | CH_M_R030 | CH_U_R045 |
| CH_L_R045 | CH_M_R060 | CH_U_R030 |
| CH_L_R045 | CH_M_R060 | CH_U_R045 |
| CH_M_180 | CH_U_180 | |
| CH_M_L090 | CH_U_L090 | |
| CH_M_L110 | CH_U_L110 | |
| CH_M_L135 | CH_U_L135 | |
| CH_M_L090 | CH_U_L110 | |
| CH_M_L090 | CH_U_L135 | |
| CH_M_L110 | CH_U_L090 | |
| CH_M_L110 | CH_U_L135 | |
| CH_M_L135 | CH_U_L090 | |
| CH_M_L135 | CH_U_L135 | |
| CH_M_R090 | CH_U_R090 | |
| CH_M_R110 | CH_U_R110 | |
| CH_M_R135 | CH_U_R135 | |
| CH_M_R090 | CH_U_R110 | |
| CH_M_R090 | CH_U_R135 | |
| CH_M_R110 | CH_U_R090 | |
| CH_M_R110 | CH_U_R135 | |
| CH_M_R135 | CH_U_R090 | |
| CH_M_R135 | CH_U_R135 | |

The invention claimed is:

1. A method for mapping a plurality of input audio loudspeaker channels of an input reproduction setup to output audio loudspeaker channels of an output audio loudspeaker channel configuration, the output audio loudspeaker channel configuration defining the output audio loudspeaker channels present in an output reproduction setup, the method comprising:

providing a table comprising entries, wherein each entry of the table defines a rule associated with an input audio loudspeaker channel and defining a different mapping between the associated input audio loudspeaker channel and a set of output audio loudspeaker channels, wherein the table is not associated with a specific input audio loudspeaker channel configuration, obtaining selected rules by performing operations a) and b) for each of the plurality of input audio loudspeaker channels of the input audio loudspeaker channels:

a) accessing a set of rules associated with this input audio loudspeaker channel comprising a1) accessing rules of the table associated with this input audio loudspeaker channel, or a2) accessing a first rule not included in the table and defining a direct mapping between the input audio loudspeaker channel and an output audio loudspeaker channel having the same direction, and, if the output audio loudspeaker channel in the first rule is not available in the output audio loudspeaker configuration, accessing rules of the table associated with this input audio loudspeaker channel, wherein accessing comprises determining for each accessed rule whether the set of output audio loudspeaker channels defined in the accessed rule is available in the output audio loudspeaker channel configuration, and b) selecting a rule of the set of rules associated with this input audio loudspeaker channel, in which the set of output audio loudspeaker channels is present in the output audio loudspeaker channel configuration; and mapping the input audio loudspeaker channels to the output audio loudspeaker channels according to the selected rules.

2. The method of claim 1, wherein each rule defines for the associated input loudspeaker channel at least one of a gain coefficient to be applied to the input audio loudspeaker channel, a delay coefficient to be applied to the input audio loudspeaker channel, a panning law to be applied to map the input audio loudspeaker channel to two or more output audio loudspeaker channels, and a frequency-dependent gain to be applied to the input audio loudspeaker channel.

3. The method of claim 1, wherein rules in the set of rules associated with this input loudspeaker are prioritized, wherein selecting a rule of the set of rules associated with this input loudspeaker channel comprises selecting a highest prioritized rule of the set of rules associated with this input audio loudspeaker channel, in which the set of output audio loudspeaker channels is present in the output audio loudspeaker channel configuration.

4. The method of claim 3, wherein the set of rules for each input loudspeaker channel is in the form of a prioritized list of rules, wherein the method comprises iteratively accessing the rules in the sets of rules in a specific order until it is determined that the set of output audio loudspeaker channels defined in an accessed rule is present in the output audio loudspeaker channel configuration such that prioritization of the rules is given by the specific order, wherein iteratively accessing the rules in the sets of rules comprises:

selecting the accessed rule if the set of output audio loudspeaker channels defined in the accessed rule is available in the output audio loudspeaker channel configuration, and not selecting the accessed rule and accessing a next rule in the prioritized list of rules if the set of output audio loudspeaker channels defined in the accessed rule is not available in the output audio loudspeaker channel configuration.

5. The method of claim 3, wherein each rule of the set of rules associated with each input audio loudspeaker channel has assigned therewith a cost term reflecting a quality impact if applying the rule, wherein a rule having a lower cost term is higher prioritized than a rule having a higher cost term.

6. The method of claim 3, wherein a rule defining mapping of one of the input audio loudspeaker channels to a set of one or more output audio loudspeaker channels having a lower direction deviation from that input audio loudspeaker channel in a horizontal listener plane is higher prioritized than a rule defining mapping of that input audio loudspeaker channel to a set of one or more output audio loudspeaker channels having a higher direction deviation from that input audio loudspeaker channel in the horizontal listener plane.

7. The method of claim 3, wherein a rule defining mapping one of the input audio loudspeaker channels to a set of one or more output audio loudspeaker channels exhibiting a same elevation angle as that input audio loudspeaker channel is higher prioritized than a rule defining mapping of that input audio loudspeaker channel to a set of one or more output audio loudspeaker channels having an elevation angle different from the elevation angle of that input audio loudspeaker channel.

8. The method of claim 3, wherein, in the sets of rules associated with one of the input audio loudspeaker channels, the highest prioritized rule defines direct mapping between the input audio loudspeaker channel and an output audio loudspeaker channel, which comprises the same direction.

9. The method of claim 8, further comprising, for each input audio loudspeaker channel, checking whether an output audio loudspeaker channel comprising the same direction as the input audio loudspeaker channel is present in the output audio loudspeaker channel configuration before accessing a memory storing the table including the other rules of the set or rules associated with each input audio loudspeaker channel.

10. The method of claim 3, wherein, in each of the sets of rules, the lowest prioritized rule defines mapping of the input audio loudspeaker channel to a set of one or both output audio loudspeaker channels of a stereo output audio loudspeaker channel configuration having a left output audio loudspeaker channel and a right output audio loudspeaker channel.

11. The method of claim 3, wherein one rule of a set of rules associated with one of the input audio loudspeaker channels, which has an elevation angle of 90°, defines mapping that input audio loudspeaker channel to a set of all available output audio loudspeaker channels having a first elevation angle lower than the elevation angle of that input audio loudspeaker channel, and another less prioritized rule of that set or rules defines mapping that input audio loudspeaker channel to a set of all available output audio loudspeaker channels having a second elevation angle lower than that first elevation angle.

12. The method of claim 1, wherein one rule of a set of rules associated with one of the input audio loudspeaker channels having a direction different from a front center direction, defines mapping that input audio loudspeaker channel to a set of two output audio loudspeaker channels which are located on the same side of the front center direction as the input audio loudspeaker channel and which are located on both sides of the direction of that input audio loudspeaker channel, and another less prioritized rule of that set or rules defines mapping that input audio loudspeaker channel to a single output audio loudspeaker channel located on the same side of the front center direction as that input audio loudspeaker channel.

13. The method of claim 1, wherein a rule of a set of rules associated with one of the input audio loudspeaker channels, which comprises a front center direction defines mapping that input audio loudspeaker channel to a set of two output audio loudspeaker channels, one located on the left side of the front center direction and one located on the right side of the front center direction.

14. The method of claim 1, wherein a specific rule of a set of rules associated with one of the input audio loudspeaker channels, which comprises a rear center direction, defines mapping that input audio loudspeaker channel to a set of two output audio loudspeaker channels, one located on the left side of a front center direction and one located on the right side of the front center direction, wherein that specific rule further defines using a gain coefficient of less than one if an angle of the two output audio loudspeaker channels relative to the rear center direction is more than 90°.

15. The method of claim 1, wherein a specific rule of a set of rules associated with a specific one of the input audio loudspeaker channels, which comprises a direction different from a front center direction, defines using a gain coefficient of less than one in mapping that specific input audio loudspeaker channel to a set of a single output audio loudspeaker channel located on the same side of the front center direction as that specific input audio loudspeaker channel, wherein an angle of that single output audio loudspeaker channel relative to a front center direction is less than an angle of that specific input audio loudspeaker channel relative to the front center direction.

16. The method of claim 1, wherein a rule defining mapping of one of the input audio loudspeaker channels, which comprises an elevation angle, to a set of one or more output audio loudspeaker channels having an elevation angle lower than the elevation angle of that input audio loudspeaker channel defines using a gain coefficient of less than one.

17. The method of claim 1, wherein a rule defining mapping of one of the input audio loudspeaker channels, which comprises an elevation angle, to a set of one or more output audio loudspeaker channels comprising an elevation angle lower than the elevation angle of that input audio loudspeaker channel defines applying a frequency selective processing.

18. The method of claim 1, comprising receiving input audio signals associated with the input audio loudspeaker channels, wherein mapping the input audio loudspeaker channels to the output audio loudspeaker channels comprises evaluating the selected rules to derive coefficients to be applied to the input audio signals and applying the coefficients to the input audio signals in order to generate output audio signals associated with the output audio loudspeaker channels.

19. The method of claim 18, comprising generating a downmix matrix and applying the downmix matrix to the input audio signals.

20. The method of claim 18, comprising applying trim delays and trim gains to the output audio signals in order to reduce or compensate for differences between distances of the respective loudspeakers from the central listener position in the input reproduction setup and the output audio loudspeaker channel configuration.

21. The method of claim 18, comprising taking into consideration a deviation between a horizontal angle of a real scenario output loudspeaker channel and a horizontal angle of a specific output audio loudspeaker channel defined in the set of rules when evaluating a rule defining mapping of one of the input audio loudspeaker channels to a set of one or two output audio loudspeaker channels comprising the specific output audio loudspeaker channel, wherein the horizontal angles represent angles within a horizontal listener plane relative to a front center direction.

22. The method of claim 18, comprising modifying a gain coefficient, which is defined in a specific rule defining mapping a specific one of the input audio loudspeaker channels, which comprises an elevation angle, to a set of one or more output audio loudspeaker channels having elevation angles lower than the elevation angle of that specific input audio loudspeaker channel, to take into consideration a deviation between an elevation angle of a real scenario output audio loudspeaker channel and an elevation angle of one output audio loudspeaker channel defined in that specific rule.

23. The method of claim 18, comprising modifying a frequency selective processing defined in a specific rule defining mapping a specific one of the input audio loudspeaker channels, which comprises an elevation angle, to a set of one or more output audio loudspeaker channels having elevation angles lower than the elevation angle of that specific input audio loudspeaker channel, to take into consideration a deviation between an elevation angle of a real scenario output audio loudspeaker channel and an elevation angle of one output audio loudspeaker channel defined in that specific rule.

24. A non-transitory digital storage medium having a computer program stored thereon to perform the method of claim 1, when the non-transitory computer-readable medium is run by a computer or a processor.

25. A signal processing unit comprising a processor configured or programmed to perform a method for mapping a plurality of input audio loudspeaker channels of an input reproduction setup to output audio loudspeaker channels of an output audio loudspeaker channel configuration, the input audio loudspeaker channel configuration defining the input audio loudspeaker channels present in an input reproduction setup and the output audio loudspeaker channel configuration defining the output audio loudspeaker channels present in an output reproduction setup, the method comprising:

providing a table comprising entries, wherein each entry of the table defines a rule associated with an input audio loudspeaker channel and defining a different mapping between the associated input audio loudspeaker channel and a set of output audio loudspeaker channels, wherein the table is not associated with a specific input audio loudspeaker channel configuration, obtaining selected rules by performing operations a) and b) for each input audio loudspeaker channel of the plurality of input audio loudspeaker channels:

a) accessing a set of rules associated with this input audio loudspeaker channel, comprising a1) accessing rules of the table associated with this input audio loudspeaker channel, or a2) accessing a first rule not included in the table and defining a direct mapping between the input audio loudspeaker channel and an output audio loudspeaker channel having the same direction, and, if the output audio loudspeaker channel in the first rule is not available in the output audio loudspeaker configuration, accessing rules of the table associated with this input audio loudspeaker channel, wherein accessing comprises determining for each accessed rule whether the set of output audio loudspeaker channels defined in the accessed rule is available in the output audio loudspeaker channel configuration, and, b) selecting a rule of the set of rules associated with this input audio loudspeaker channel, in which the set of output audio loudspeaker channels is present in the output audio loudspeaker channel configuration; and mapping the input audio loudspeaker channels to the output audio loudspeaker channels according to the selected rules.

26. The signal processing unit of claim 25, further comprising:

an input signal interface for receiving input signals associated with the input audio loudspeaker channels of the input reproduction setup, and an output signal interface for outputting output audio signals associated with the output audio loudspeaker channel configuration.

27. An audio decoder comprising the signal processing unit according to claim 25.

28. A method for mapping a plurality of input audio loudspeaker channels of an input audio loudspeaker channel configuration to output audio loudspeaker channels of an output audio loudspeaker channel configuration, the input audio loudspeaker channel configuration defining the input audio loudspeaker channels present in an input reproduction setup and the output audio loudspeaker channel configuration defining the output audio loudspeaker channels present in an output reproduction setup, the method comprising:

providing a table comprising entries, wherein each entry of the table defines a rule associated with an input audio loudspeaker channel and defining a different mapping between the associated input audio loudspeaker channel and a set of output audio loudspeaker channels, wherein the rules in the table are associated with input audio loudspeaker channels of a plurality of different input audio loudspeaker channel configurations, obtaining selected rules by performing operations a) and b) for each of the plurality of input audio loudspeaker channels of the input audio loudspeaker channels:

a) accessing a set of rules associated with this input audio loudspeaker channel comprising a1) accessing rules of the table associated with this input audio loudspeaker channel, or a2) accessing a first rule not included in the table and defining a direct mapping between the input audio loudspeaker channel and an output audio loudspeaker channel having the same direction, and, if the output audio loudspeaker channel in the first rule is not available in the output audio loudspeaker configuration, accessing rules of the table associated with this input audio loudspeaker channel, wherein accessing comprises determining for each accessed rule whether the set of output audio loudspeaker channels defined in the accessed rule is available in the output audio loudspeaker channel configuration, and b) selecting a rule of the set of rules associated with this input audio loudspeaker channel, in which the set of output audio loudspeaker channels is present in the output audio loudspeaker channel configuration; and mapping the input audio loudspeaker channels to the output audio loudspeaker channels according to the selected rules.

29. A signal processing unit comprising a processor configured or programmed to perform a method for mapping a plurality of input audio loudspeaker channels of an input audio loudspeaker channel configuration to output audio loudspeaker channels of an output audio loudspeaker channel configuration, the input audio loudspeaker channel configuration defining the input audio loudspeaker channels present in an input reproduction setup and the output audio loudspeaker channel configuration defining the output audio loudspeaker channels present in an output reproduction setup, the method comprising:

providing a table comprising entries, wherein each entry of the table defines a rule associated with an input audio loudspeaker channel and defining a different mapping between the associated input audio loudspeaker channel and a set of output audio loudspeaker channels, wherein the table includes rules associated with input loudspeaker channels of a plurality of input audio loudspeaker channel configurations, obtaining selected rules by performing operations a) and b) for each input audio loudspeaker channel of the plurality of input audio loudspeaker channels:

a) accessing a set of rules associated with this input audio loudspeaker channel, comprising a1) accessing rules of the table associated with this input audio loudspeaker channel, or a2) accessing a first rule not included in the table and defining a direct mapping between the input audio loudspeaker channel and an output audio loudspeaker channel having the same direction, and, if the output audio loudspeaker channel in the first rule is not available in the output audio loudspeaker configuration, accessing rules of the table associated with this input audio loudspeaker channel, wherein accessing comprises determining for each accessed rule whether the set of output audio loudspeaker channels defined in the accessed rule is available in the output audio loudspeaker channel configuration, and, b) selecting a rule of the set of rules associated with this input audio loudspeaker channel, in which the set of output audio loudspeaker channels is present in the output audio loudspeaker channel configuration; and mapping the input audio loudspeaker channels to the output audio loudspeaker channels according to the selected rules.

* * * * *